United States Patent
Mock et al.

(10) Patent No.: US 11,906,021 B2
(45) Date of Patent: Feb. 20, 2024

(54) CLUTCH CONFIGURATIONS FOR A MULTIPLE MOTOR MIXED-SPEED CONTINUOUS POWER TRANSMISSION

(71) Applicant: Allison Transmission, Inc., Indianapolis, IN (US)

(72) Inventors: Isaac Mock, Martinsville, IN (US); James Allen Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 17/807,330

(22) Filed: Jun. 16, 2022

(65) Prior Publication Data

US 2022/0307575 A1    Sep. 29, 2022

Related U.S. Application Data

(60) Continuation of application No. PCT/US2021/070491, filed on Apr. 30, 2021, and a
(Continued)

(51) Int. Cl.
*F16H 63/30* (2006.01)
*B60K 1/02* (2006.01)
(Continued)

(52) U.S. Cl.
CPC ............ *F16H 3/724* (2013.01); *B60K 1/02* (2013.01); *B60K 17/02* (2013.01); *F16D 11/00* (2013.01);
(Continued)

(58) Field of Classification Search
CPC .. F16H 3/724; F16H 63/30; F16H 2063/3093; B60K 1/02; B60K 17/02;
(Continued)

(56) References Cited

U.S. PATENT DOCUMENTS

| 4,368,810 A | 1/1983 | Maucher et al. |
| 4,449,416 A | 5/1984 | Huitema |

(Continued)

FOREIGN PATENT DOCUMENTS

| FR | 2834322 A1 | 7/2003 |
| FR | 3056667 A1 * | 3/2018 |

(Continued)

OTHER PUBLICATIONS

PCT, Intl. App. No. PCT/US2021/070491 International Search Report (ISR), 4 pages, dated Jul. 29, 2021.
(Continued)

*Primary Examiner* — David R Morris
(74) *Attorney, Agent, or Firm* — Woodard, Emhardt, Henry, Reeves & Wagner, LLP

(57) ABSTRACT

An electric powertrain includes a first electric motor that has an uninterrupted connection with a drive shaft of a vehicle. The electric powertrain further includes a second electric motor that has an interruptible connection with the drive shaft. In one form, this interruptible connection includes a clutch. The electric powertrain further includes a first gear train in the form of a first planetary gear and a second gear train in the form of a second planetary gear. The clutch in one variation includes a positive clutch in the form of a dog clutch. The dog clutch has a clutch suspension configured to deflect a clutch collar when gearing is misaligned during shifting.

16 Claims, 17 Drawing Sheets

Related U.S. Application Data division of application No. 15/929,414, filed on Apr. 30, 2020, now Pat. No. 11,371,589.

(51) Int. Cl.
| | |
|---|---|
| *B60K 17/02* | (2006.01) |
| *F16H 3/72* | (2006.01) |
| *F16D 11/00* | (2006.01) |
| *F16D 41/00* | (2006.01) |
| *F16D 23/14* | (2006.01) |
| *F16D 13/74* | (2006.01) |
| *F16D 13/22* | (2006.01) |
| *F16D 13/72* | (2006.01) |

(52) U.S. Cl.
CPC ............ *F16D 23/14* (2013.01); *F16D 41/00* (2013.01); *F16H 63/30* (2013.01); *F16D 13/22* (2013.01); *F16D 13/72* (2013.01); *F16D 13/74* (2013.01); *F16D 2023/141* (2013.01); *F16H 2063/3093* (2013.01)

(58) Field of Classification Search
CPC .... F16D 11/00; F16D 23/14; F16D 2023/141; F16D 41/00
See application file for complete search history.

(56) References Cited

U.S. PATENT DOCUMENTS

| | | |
|---|---|---|
| 5,598,910 A | 2/1997 | Moroto et al. |
| 8,196,687 B2 | 6/2012 | Swales et al. |
| 8,311,694 B2 | 11/2012 | Imai et al. |
| 8,443,954 B2 | 5/2013 | Quehenberger et al. |
| 8,465,387 B2 | 6/2013 | Conlon |
| 8,647,237 B2 | 2/2014 | Prix et al. |
| 9,421,856 B2 | 8/2016 | Frank et al. |
| 9,463,698 B2 | 10/2016 | Severinsky et al. |
| 9,566,852 B2 | 2/2017 | Knoblauch et al. |
| 9,573,585 B2 | 2/2017 | Severinsky et al. |
| 9,944,279 B2 | 4/2018 | Hata et al. |
| 10,144,309 B2 | 12/2018 | Leng et al. |
| 10,183,570 B2 | 1/2019 | Kimes et al. |
| 11,040,607 B2 | 6/2021 | McGrew et al. |
| 11,173,781 B2 | 11/2021 | Mock et al. |
| 11,193,562 B1 | 12/2021 | McGrew, Jr. et al. |
| 2002/0078787 A1 | 6/2002 | Comfort et al. |
| 2004/0138801 A1 | 7/2004 | Yasui et al. |
| 2009/0029824 A1 | 1/2009 | Tabata et al. |
| 2010/0089685 A1 | 4/2010 | Quehenberger et al. |
| 2010/0227722 A1 | 9/2010 | Conlon |
| 2011/0251747 A1 | 10/2011 | Imai et al. |
| 2012/0018274 A1 | 1/2012 | Prix et al. |
| 2013/0095970 A1 | 4/2013 | Conlon et al. |
| 2017/0182995 A1 | 6/2017 | Endo et al. |
| 2017/0182997 A1 | 6/2017 | Hata et al. |
| 2018/0259012 A1 | 9/2018 | Shibata et al. |
| 2021/0008968 A1 | 1/2021 | McGrew et al. |
| 2021/0188066 A1 | 6/2021 | McGrew et al. |
| 2021/0188075 A1 | 6/2021 | Mock et al. |
| 2021/0356039 A1* | 11/2021 | Reisch .................... F16H 63/30 |
| 2021/0372506 A1 | 12/2021 | McGrew, Jr. et al. |

FOREIGN PATENT DOCUMENTS

| | | | |
|---|---|---|---|
| JP | H06-51615 U * | 7/1994 | ............ F16H 63/32 |
| WO | 2007118082 A2 | 10/2007 | |
| WO | 2018224742 A1 | 12/2018 | |

OTHER PUBLICATIONS

PCT, Intl. App. No. PCT/US2021/070491 Written Opinion, 6 pages, dated Jul. 29, 2021.

GB, Examination Report under Section 18(3) for Great Britain Patent App. No. GB2217929.5, dated May 10, 2023.

* cited by examiner

CLUTCH CONFIGURATIONS FOR A MULTIPLE MOTOR MIXED-SPEED CONTINUOUS POWER TRANSMISSION

REFERENCE TO RELATED APPLICATIONS

This application is a divisional of U.S. patent application Ser. No. 15/929,414, filed Apr. 30, 2020, which is hereby incorporated by reference. This application is a continuation of International Patent Application Number PCT/US2021/070491, filed Apr. 30, 2021, which is hereby incorporated by reference.

BACKGROUND

With environmental and other concerns, there has been a recent trend to convert vehicles powered by fossil fuels to other forms of energy such as electricity. Significant developments of electric motor technology have occurred mainly in the consumer passenger car field. However, commercial heavy duty vehicles have been slower to transition from fossil fuels to electricity due to a number of factors including the high torque requirements for such vehicles and vehicle range concerns. The greater torques required to drive such commercial vehicles require larger and heavier electric motors which can tend to increase energy consumption. Power losses during shifting have discouraged the use of transmissions with electric motors.

Thus, there is a need for improvement in this field.

SUMMARY

A multiple electric motor system has been developed to address the issues mentioned above as well as other issues. In one form, the system includes dual electric motors that provide power to an output such as a driveshaft of a vehicle. One of the electric motors ("A"), which will be referred to as the "first motor" for our purposes, is always connected to the output drive shaft in order to continuously provide power for propelling the vehicle. In other words, the first electric motor (A) has an uninterrupted connection with the output. The system further includes a second electric motor ("B") that intermittently applies torque to the output shaft. In one variation, this intermittent connection between the second electric motor (B) and the output includes at least one clutch. The clutch engages and disengages the second electric motor (B) with the output shaft.

Several unique clutch configurations have been developed to reduce power loss as well as promote the operation of the electric motors within optimal ranges for the motors. As noted before, one or more clutches are used to connect and disconnect the second electric motor (B) from the output. With certain clutch designs, however, significant power losses can occur which has discouraged the use of transmissions with electric vehicles. In one version, the system uses a positive clutch, such as a dog clutch, in order to reduce power loss during shifting. Other types of clutches typically require frictional engagement which is a frictional power loss source during shifting. Positive clutches on the other hand typically use a mechanical interference type engagement which can reduce or even eliminate frictional power loses during shifting. Gear teeth alignment issues with dog clutches are always a concern because without proper alignment the gears can undesirably grind during shifting. Common dog clutch designs incorporate a synchronizer mechanism, or synchromesh, that is used to synchronize the velocity (speed) and alignment of the gears during shifting using friction. It was however discovered this friction used by the synchromesh during shifting created power loss and other undesirable issues for electric motor vehicle designs.

In one form, the multiple electric motor system uses a positive clutch that does not have a synchromesh, and in one particular variation, the system uses a dog clutch that does not have a synchromesh or other frictional based synchronizing device. To synchronize the gears during shifting, the system has a controller that monitors the relative location and speed of the motors based on information from the electric motors. For control purposes, most electric motors include an internal resolver that measures the relative speed and orientation of the output shaft of the electric motor. Based on the shaft speed and orientation information from the resolvers in the first and second electric motors, the controller is able to deduce the relative speed and orientation of the gears being shifted. The controller is operatively coupled to an actuator that actuates the dog clutch. Once the gear speeds and orientations are matched or nearly matched, the controller actuates the dog clutch to engage the gears.

In some cases, the gear orientations and/or speeds might not be perfectly matched in the dog clutch. To minimize the risk of damage in such a case, the dog clutch includes a clutch suspension that allows the collar of the dog clutch to bend or deflect away when the teeth of the gears are not properly meshed during shifting. In one form, the clutch suspension for the clutch can include a leaf spring for biasing the clutch. In another example, the clutch suspension for the dog clutch includes a torsion spring positioned at the pivot point of the clutch. In still yet another example, the clutch system has an actuator and a selectable one-way clutch (SOWC) that is used for connecting the second electric motor (B) to the output. Other types of clutches such as a hybrid mechanical-electrical type clutches can be used as well.

Aspect 1 generally concerns a system that includes a first electric motor having an uninterrupted connection to an output and a second electric motor with a clutch connected to the output.

Aspect 2 generally concerns the system of any previous aspect in which the second electric motor is connected to the output via the clutch.

Aspect 3 generally concerns the system of any previous aspect in which the clutch includes a positive clutch.

Aspect 4 generally concerns the system of any previous aspect in which the positive clutch includes a dog clutch.

Aspect 5 generally concerns the system of any previous aspect in which the clutch includes a clutch suspension configured to deflect the clutch during improper engagement.

Aspect 6 generally concerns the system of any previous aspect in which the clutch suspension includes a torsion spring wrapped around a pivot pin.

Aspect 7 generally concerns the system of any previous aspect in which the clutch suspension further includes a shift fork and a fork actuator arm pivotally coupled via the pivot pin.

Aspect 8 generally concerns the system of any previous aspect in which the clutch suspension includes a leaf spring.

Aspect 9 generally concerns the system of any previous aspect in which the clutch suspension includes a helical spring.

Aspect 10 generally concerns the system of any previous aspect in which the clutch suspension includes a Belleville spring.

Aspect 11 generally concerns the system of any previous aspect in which the controller configured to engage the clutch based on resolver information from the first and second electric motors.

Aspect 12 generally concerns the system of any previous aspect in which the clutch has a single actuator.

Aspect 13 generally concerns the system of any previous aspect in which the clutch includes a hybrid mechanical-electrical clutch.

Aspect 14 generally concerns the system of any previous aspect in which the clutch includes a wet disc clutch.

Aspect 15 generally concerns the system of any previous aspect in which the clutch includes a dry disc clutch.

Aspect 16 generally concerns the system of any previous aspect in which the clutch includes a one-way clutch.

Aspect 17 generally concerns the system of any previous aspect in which the one-way clutch includes a Selectable One-Way Clutch (SOWC).

Aspect 18 generally concerns the system of any previous aspect in which a planetary gear is configured to change torque from the second electric motor based on clutch position of the clutch.

Aspect 19 generally concerns the system of any previous aspect in which the clutch has an actuator and a Selectable One-Way Clutch (SOWC).

Aspect 20 generally concerns the system of any previous aspect in which the clutch is configured to engage the planetary gear to change the torque from the second electric motor.

Aspect 21 generally concerns the system of any previous aspect in which the clutch lacks a synchromesh.

Aspect 22 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
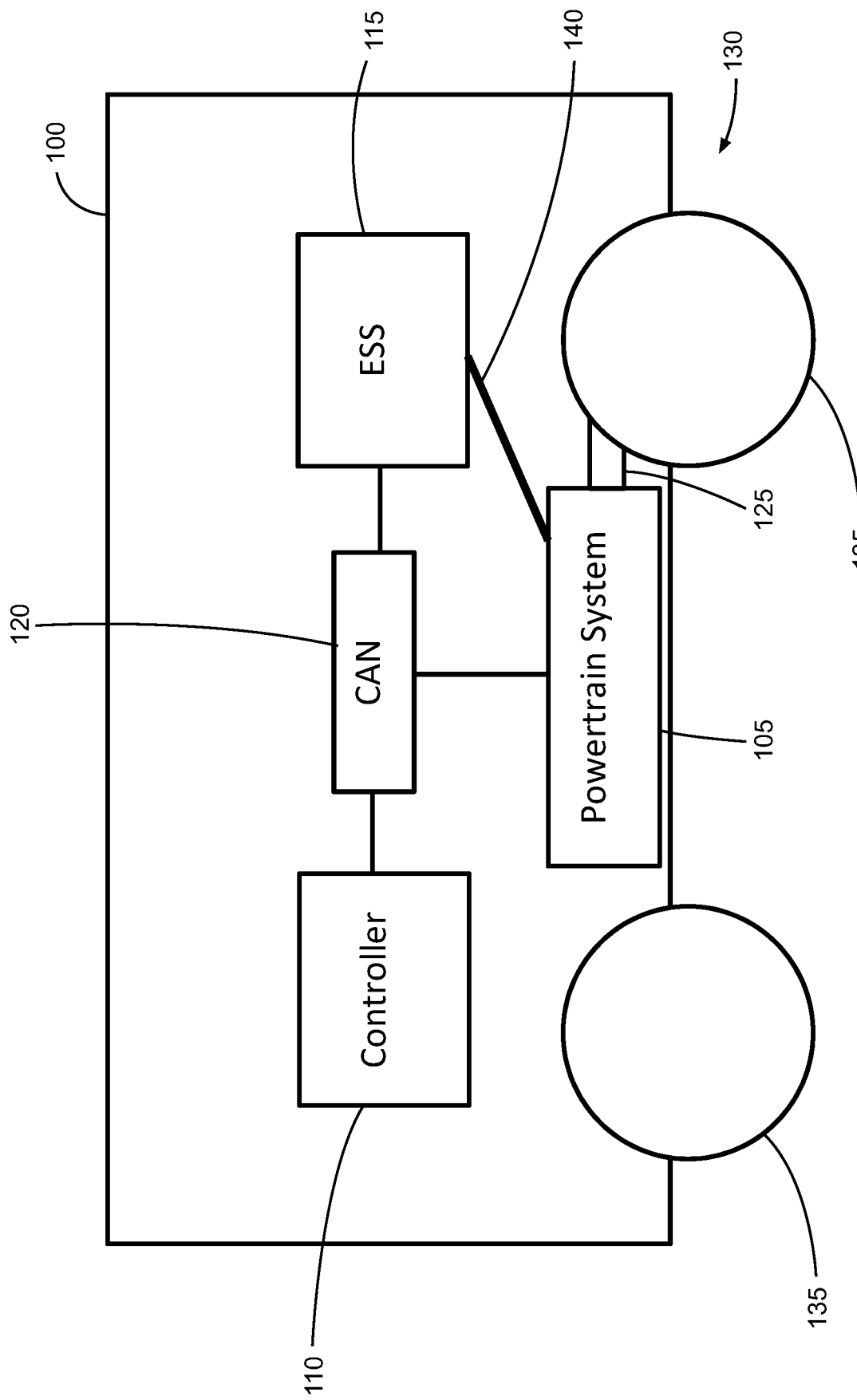
FIG. 1 is a diagrammatic view of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A vehicle 100 according to one example is illustrated in FIG. 1. As shown, the vehicle 100 includes at least one powertrain system 105, at least one controller 110, and at least one Energy Storage System ("ESS") 115 configured to supply power to the powertrain system 105. The powertrain system 105, controller 110, and ESS 115 are operatively connected together so as to communicate with one another via at least one Controller Area Network ("CAN") 120. The controller 110 is configured to control the operation of one or more systems and/or other components of the vehicle 100 such as the powertrain system 105 and ESS 115. The powertrain system 105 has an output or drive shaft 125 that transfers mechanical power from the powertrain system 105 to a propulsion system 130. In the illustrated example, the propulsion system 130 includes one or more wheels 135, but the propulsion system 130 in further examples can include other types of propulsion devices like continuous track systems. One or more power cables 140 transfer electrical power between the powertrain system 105 and the ESS 115.

The powertrain system 105 is designed to electrically propel the vehicle 100 in an efficient manner. As will be explained in greater detail below, the powertrain system 105 is designed to power heavy-duty commercial and/or military grade vehicles such as buses, garbage trucks, delivery trucks, fire trucks, and semi-trailers. The powertrain system 105 is designed to electrically power vehicles 100 with a class group rating of at least four (4) according to the US Department of Transportation Federal Highway Administration (FHWA) classification rule set. In one form, the powertrain system 105 is configured to move at least 40,000 pound (18,144 Kg) passenger vehicles like buses. The powertrain system 105 has a unique, compact centerline design that allows the powertrain system 105 to be easily retrofitted into pre-existing vehicle chassis designs and/or conventional drivetrains with minimal changes to the other parts of the vehicle 100 like the braking and suspension systems. This in turn allows existing internal combustion type vehicles to be readily reconfigured as fully electric vehicles. Moreover, the centerline design of the powertrain system 105 reduces gear loss and other power losses so as to make the vehicle 100 more power efficient which in turn can improve driving range and/or reduce weight of other components such as the ESS 115.

Figure 2:
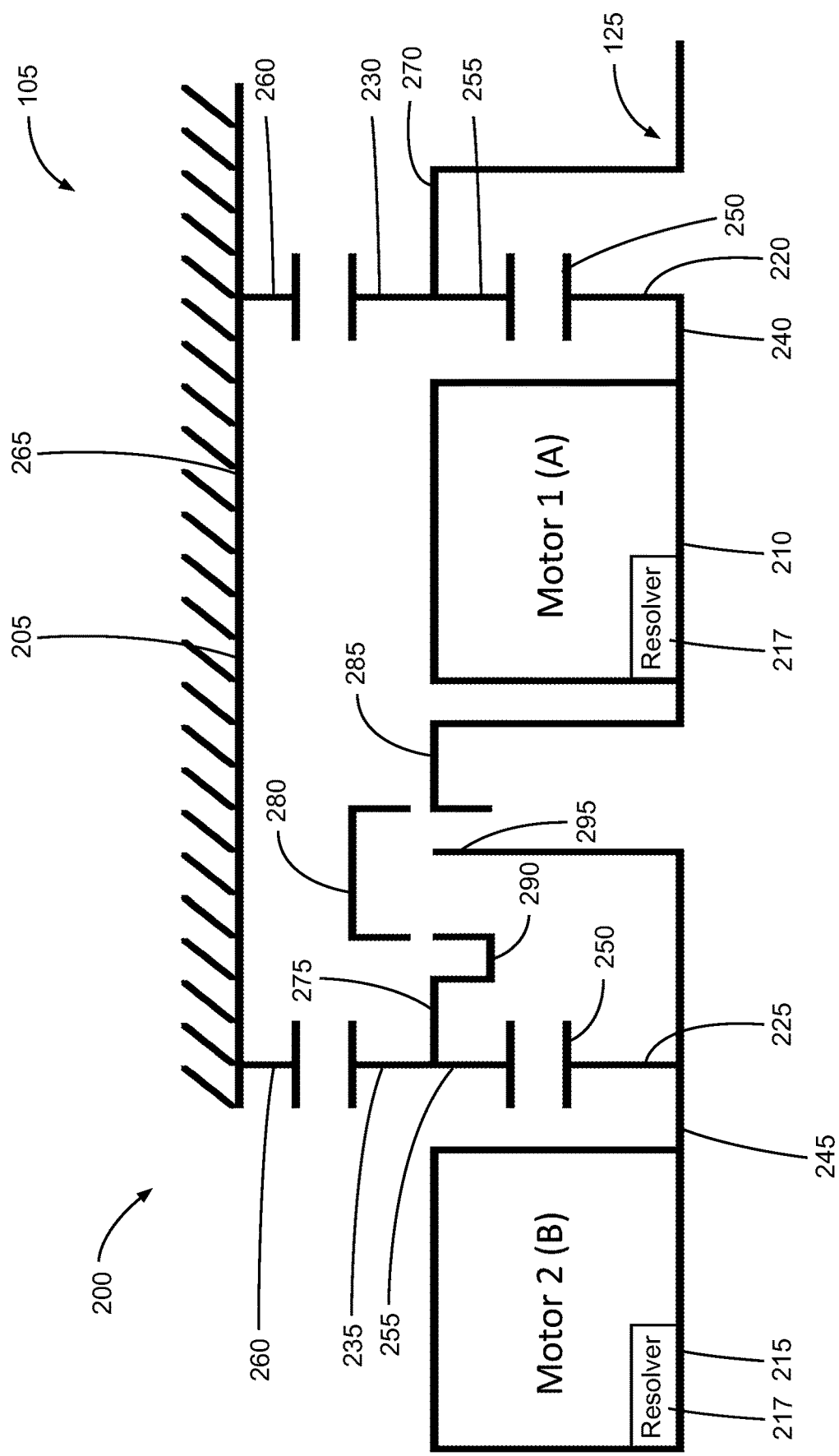
FIG. 2 is a diagrammatic view of one example of an electric powertrain that can be used in the vehicle of FIG. 1.

FIG. 2 shows a diagram of one example of an electric powertrain 200 that can be used in the powertrain system 105 of FIG. 1. As depicted, the electric powertrain 200 includes a multiple motor continuous power transmission 205. The transmission 205 of the electric powertrain 200 includes a first electric motor 210, which is referred to as "Motor A" occasionally, and a second electric motor 215 that is referred to as "Motor B" at times. In one example, the first electric motor 210 and second electric motor 215 are the same type of electric motor such that both motors generally provide the same speed and torque output within normal manufacturing tolerances. The first electric motor 210 and second electric motor 215 in one form are both high speed electric motors, and in another form, the first electric motor 210 and second electric motor 215 are both low speed electric motors. In alternative variations, the first electric motor 210 and second electric motor 215 can be different types (e.g., permanent magnet motors, induction motors, switched reluctance motors, etc.) and/or have different designs/configurations (e.g., pole counts, winding patterns, etc.).

As shown, the first electric motor 210 and second electric motor 215 each include a sensor in the form of a resolver 217 that is configured to sense the motor rotational orientation, velocity, and/or acceleration, among other things. The resolvers 217 are operatively coupled to the controller 110 via the CAN 120. Typically, but not always, the electric motor is manufactured with the resolver 217 so as to facilitate control of the motor.

The transmission 205 of the electric powertrain 200 further includes a first gear train 220 located at an output end of the first electric motor 210 and a second gear train 225 located at the output end of the second electric motor 215. As can be seen, the first gear train 220 is located at the output end of the entire transmission 205 that is proximal to the drive shaft 125. The second gear train 225 is sandwiched or located between the first electric motor 210 and the second electric motor 215. This configuration allows the electric powertrain 200 to have a compact design. In the illustrated example, the first gear train 220 is in the form of a first planetary gear 230, and the second gear train 225 is in the form of a second planetary gear 235. The first electric motor 210 and second electric motor 215 respectively have a first output shaft 240 and a second output shaft 245 for providing rotational mechanical power. As illustrated in FIG. 2, the first planetary gear 230 and second planetary gear 235 each has a sun gear 250, one or more planet gears 255 meshed with the sun gear 250, and a ring gear 260 that surrounds and meshes with the planet gears 255. The sun gear 250 of the first planetary gear 230 is secured to the first output shaft 240 of the first electric motor 210, and the sun gear 250 of the second planetary gear 235 is secured to the second output shaft 245 of the second electric motor 215. Both ring gears 260 of the first planetary gear 230 and the second planetary gear 235 are secured to a housing 265 of the electric powertrain 200. The planet gears 255 of the first planetary gear 230 are carried by a first carrier 270. The first carrier 270 is configured to connect with the drive shaft 125 so as to transfer mechanical power from the transmission 205 to the propulsion system 130. The planet gears 255 of the second planetary gear 235 are carried by a second carrier 275.

As shown in FIG. 2, the electric powertrain 200 includes at least one clutch 280 that engages and disengages the second electric motor 215 from the first electric motor 210. Through the clutch 280, the transmission 205 of the electric powertrain 200 is further able to shift gears such that the speed and torque from second electric motor 215 can be changed. The first electric motor 210 is permanently connected to the drive shaft 125 (i.e., there is no clutch) such that the first electric motor 210 is able to provide continuous power to the drive shaft 125 and propulsion system 130. In other words, the first electric motor 210 has an uninterrupted connection to the drive shaft 125, and the second electric motor 215 has an interruptible connection to the drive shaft 125. This configuration of the electric powertrain 200 facilitates power shifting in which power is always able to be provided to the wheels 135 even when shifting of the clutch 280 occurs. With power being continuously provided, any shifting can be made generally imperceptible to the driver and/or passengers. Moreover, acceleration performance of the vehicle 100 is enhanced, and the vehicle 100 is better able to maintain speed at higher grades.

In the illustrated example, the electric powertrain 200 includes a single clutch 280, but the electric powertrain 200 in other examples can include more than one clutch. In one variation, the clutch 280 is a dog clutch (e.g., 3-way dog clutch), and in another, the clutch 280 includes a dog clutch (e.g., 2-way dog clutch) along with a Selectable One-Way Clutch (SOWC). In further variations, the clutch 280 includes a wet disc type clutch and/or a dry disc type clutch. In such cases, two clutches may be needed. The first output shaft 240 for the first electric motor 210 has a clutch engagement member 285 where the clutch 280 is able to engage the first output shaft 240. The second carrier 275 of the second planetary gear 235 has a first range member 290 where the clutch 280 engages when in a first range position. When in the first range position, the clutch 280 connects the first range member 290 to the clutch engagement member 285 such that the speed (i.e., rpm) provided by the second electric motor 215 is reduced through the second gear train 225, and the torque provided by the second electric motor 215 to the first output shaft 240 is increased through the planet gears 255 of the second planetary gear 235. The second output shaft 245 of the second electric motor 215 has a second range member 295 where the clutch 280 engages when in a second range position. When in the second range position, the clutch 280 connects the second range member 295 to the clutch engagement member 285 such that the speed and torque of the second electric motor 215 is directly provided to the first output shaft 240 of the first electric motor 210. As compared to the first range position, the speed of the second electric motor 215 provided to the first output shaft 240 of the first electric motor 210 is faster, and the torque is less.

The clutch 280 can further be positioned at a neutral position where the second electric motor 215 is not mechanically coupled to the first electric motor 210. In the neutral or shift position, the first electric motor 210 can provide the sole mechanical power to propel the vehicle 100. Among other things, this ability to propel the vehicle 100 solely via the first electric motor 210 while the second electric motor 215 is disconnected from the first output shaft 240 allows the second electric motor 215 to synchronize speed with the first electric motor 210 in order to engage the clutch 280 (e.g., when the clutch 280 is a dog clutch) without power interruption to the vehicle 100. This also allows the first electric motor 210 to operate at a more efficient point than when sharing the output load with the second electric motor 215.

By using more than one electric motor, the powertrain system 105 is configured to allow smaller, consumer automotive electric motors to be used to power larger, commercial-grade vehicles such as those with a FHWA class rating of four (4) or higher. For instance, consumer automotive electric motors can be used to move vehicles 100 weighing 40,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

Due to high demand and high production volumes, improvements in electric motor technology tends to occur more rapidly in the consumer space such that it is expected that these benefits of consumer automotive electric motors over lower demand commercial-grade electric vehicle motors will become more pronounced in the future. However, there are still drawbacks to using these consumer-grade electric motors for heavy commercial vehicles. Individual consumer-grade electric vehicle motors tend to produce insufficient torque to properly move and/or accelerate heavy duty vehicles such as buses and semi-trucks. There is also a trend to have the consumer-grade electric motors operate at even higher speed or rotations per minute (rpms) which are not desirable for heavy duty commercial-grade vehicles which tend to operate at lower speeds and require higher torques.

To facilitate the use of these consumer electric vehicle motors in heavy duty commercial applications, the powertrain system 105 includes at least two electric motors (e.g., the first electric motor 210 and second electric motor 215) so as to provide sufficient torque and power to the drive shaft 125 and the propulsion system 130. The powertrain system 105 further includes at least the first gear train 220 so as to reduce the speed and increase the torque provided by the first electric motor 210 and/or second electric motor 215. As shown, the powertrain system 105 can include additional gear trains, such as the second gear train 225, to enhance the performance of the powertrain system 105.

This multiple motor design also can use energy more efficiently. The power, speed, and/or torque provided by the first electric motor 210 and the second electric motor 215 can be adjusted so that the motors operate in a more efficient manner for differing operational conditions. For example, the clutch 280 can change the gear ratios of the second gear train 225 so as to adjust the output speed and/or torque provided by the second electric motor 215. The clutch 280 can further be used to disconnect the second electric motor 215 from the first electric motor 210 such that the first electric motor 210 provides all of the propulsive mechanical power to the drive shaft 125. At the same time, the second electric motor 215 can be shutdown to conserve power and allow the first electric motor 210 to operate within an efficient power band, or the speed of the second electric motor 215 can be changed for shifting purposes. Once more, with the first electric motor 210 permanently connected to the drive shaft 125, power can be always applied to the propulsion system 130 such that any shifting of the second gear train 225 via the clutch 280 can be imperceptible to the driver and/or passengers of the vehicle 100. Given the first electric motor 210 continuously provides power to the wheels 135, the powertrain system 105 can take the proper time during shifting so as to enhance efficiency and performance of the vehicle 100. The powertrain system 105 is able to provide more than adequate time to deal with timing and synchronization issues between the first electric motor 210, second electric motor 215, second gear train 225, and/or clutch 280. By providing additional time for shifting without interrupting power, better synchronization can occur before clutch engagement which in turn prolongs the life of the clutch 280.

This unique two-motor architecture further enhances energy efficiency. For example, the controller 110 can set the torque of the first electric motor 210 to zero (0) such that the second electric motor 215 solely propels the vehicle 100. For instance, this can occur at low vehicle speeds where the speed of the first electric motor 210 would be too slow for the first electric motor 210 to operate in a highly efficient region, and other times, depending on the types and designs of the two motors.

Figure 3:
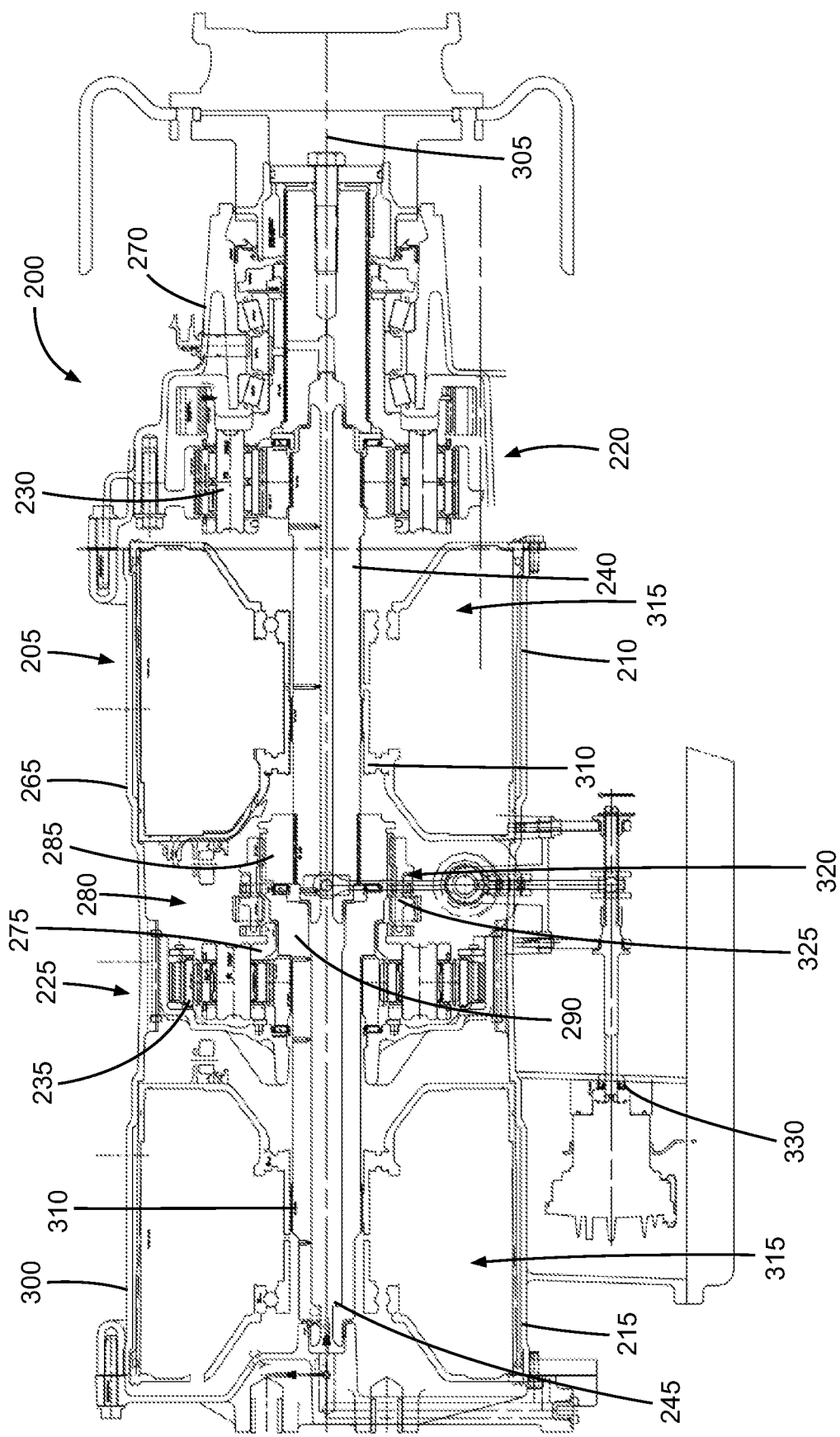
FIG. 3 is a cross-sectional view of the electric powertrain in FIG. 2.
Figure 4:
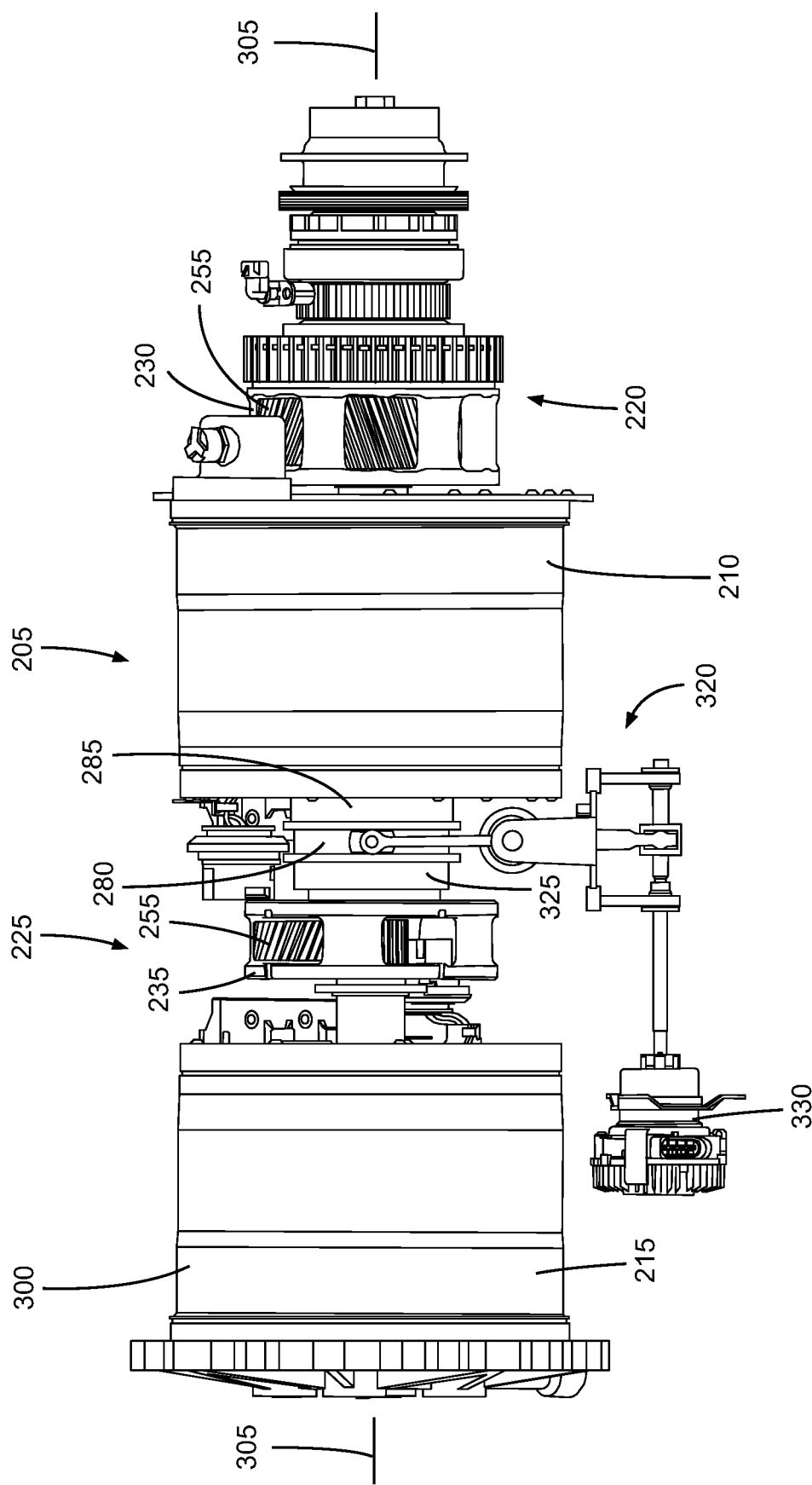
FIG. 4 is a side view of the electric powertrain in FIG. 2 with selected components removed.

One example of the transmission 205 in the electric powertrain 200 is illustrated in FIGS. 3 and 4. FIG. 3 shows a cross-sectional view of the electric powertrain 200, and FIG. 4 shows a side view of the electric powertrain 200. As can be seen, the electric powertrain 200 in this example includes an electric motor transmission 300 that is constructed in a similar fashion to the transmission 205 shown in FIG. 2. For example, the electric motor transmission 300 includes the first electric motor 210, second electric motor 215, first gear train 220, and second gear train 225 of the type described before. The first gear train 220 is in the form of the first planetary gear 230, and the second gear train 225 is in the form of the second planetary gear 235. The first planetary gear 230 is mounted to the first output shaft 240, and the second planetary gear 235 is mounted to the second output shaft 245. The first output shaft 240 and second output shaft 245 as well as the rest of the components of the electric motor transmission 300 rotate about and are oriented along a longitudinal axis 305 so as to give the electric motor transmission 300 a centerline orientation. The centerline orientation allows for the 1:1 ratio to be more efficient than a layshaft architecture with the motors on parallel which requires a gear mesh to provide power back to the output centerline. There is no such gear mesh loss for the 1:1 ratio in the illustrated centerline orientation. These power loss differentials are further magnified due to losses not only during propulsion but also during regenerative braking.

The components of the electric motor transmission 300 are housed inside the housing 265. As shown in FIG. 3, the first electric motor 210 and the second electric motor 215 each include a rotor 310 and a stator 315. The rotor 310 of the first electric motor 210 is secured to the first output shaft 240, and the rotor 310 of the second electric motor 215 is secured to the second output shaft 245. The stators 315 are in turn secured to the housing 265. The rotors 310 are configured to rotate relative to the fixed stators 315. When rotating, the rotor 310 of the first electric motor 210 rotates the first output shaft 240 which in turn powers the first planetary gear 230. The first planetary gear 230 reduces the output speed of the first electric motor 210 and/or second electric motor 215 that is supplied to the drive shaft 125 via the first carrier 270. Again, this speed reduction by the first gear train 220 can facilitate the use of higher speed consumer vehicle electric motors in heavy commercial-grade vehicles.

The rotor 310 of the stator 315 rotates the second output shaft 245 which in turn powers the second planetary gear 235. Again, the second planetary gear 235 has the second carrier 275 that is configured to transfer mechanical power to the first output shaft 240 via the clutch 280. The clutch 280 in FIG. 3 includes a positive clutch 320 in the form of a dog clutch 325. The dog clutch 325 is actuated or moved by a clutch actuator 330. The clutch actuator 330 is operatively connected to and controlled by the controller 110 over the CAN 120. In one form, the clutch actuator 330 includes an electric motor or solenoid with linkages that actuate the clutch 280 so as to engage or disengage from the first range member 290 or second range member 295. The controller 110 is further operatively connected to the first electric motor 210 and second electric motor 215 to control the speed, torque, and/or relative positions of the first electric motor 210 and second electric motor 215.

With the positive clutch 320 using an interface type connection, the dog clutch 325 dramatically reduces power loss caused by slippage which is commonly present in friction type clutches such as wet and dry disc clutches. Wet and dry clutches further typically require high hydraulic pressures. On the other hand, dog clutches normally just require low lubrication pressures. Thus, the dog clutch 325 lowers the pressure requirements for the hydraulic system in the electric motor transmission 300. The overall design of the electric powertrain 200 facilitates the use of the dog clutch 325. Through the resolvers 217 of the first electric motor 210 and second electric motor 215, the controller 110 is able to determine the relative orientation and velocity of the clutch 280 as well as the clutch engagement member 285, first range member 290, and second range member 295. With the first electric motor 210 able to provide continuous power to the drive shaft 125 when needed, the controller 110 can take the time to allow the second electric motor 215 to properly spin up or down to match the speed and relative position of the first range member 290 or second range member 295 with the clutch engagement member 285 of the first electric motor 210 so as to facilitate smooth engagement with minimal power loss.

Once more, the controller 110 through the signals received from resolvers 217 is able to electronically synchronize speeds and positions of the gearing controlled by the dog clutch 325. This in turn allows the dog clutch 325 to not need a synchromesh in order to synchronize gears during shifting, and in the illustrated example, the clutch 280 lacks or does not have a synchromesh. As noted before, the synchromesh requires friction in order to synchronize the gears during shifting. This friction used by the synchromesh during shifting creates power loss and other undesirable issues. By using the motor alignment and speed information from the resolvers 217, the dog clutch 325 does not require the synchromesh to promote smooth shifting such that energy during shifting is not lost through frictional heating caused by the synchromesh.

As can be seen in FIGS. 3 and 4, the second gear train 225 and clutch 280 are able to be received between the first electric motor 210 and second electric motor 215 so as to provide a compact configuration. Once more, this compact centerline configuration allows the electric motor transmission 300 to be readily retrofitted into preexisting vehicle designs with minimal redesign to major systems such as the suspension, braking, and steering systems. While only two motors are illustrated, the electric powertrain 200 can have more than two motors. For instance, this design is modular such that additional motors, gear trains, and/or clutches can be daisy-chained to the end of the second electric motor 215 so as to provide additional mechanical power.

Figure 5:
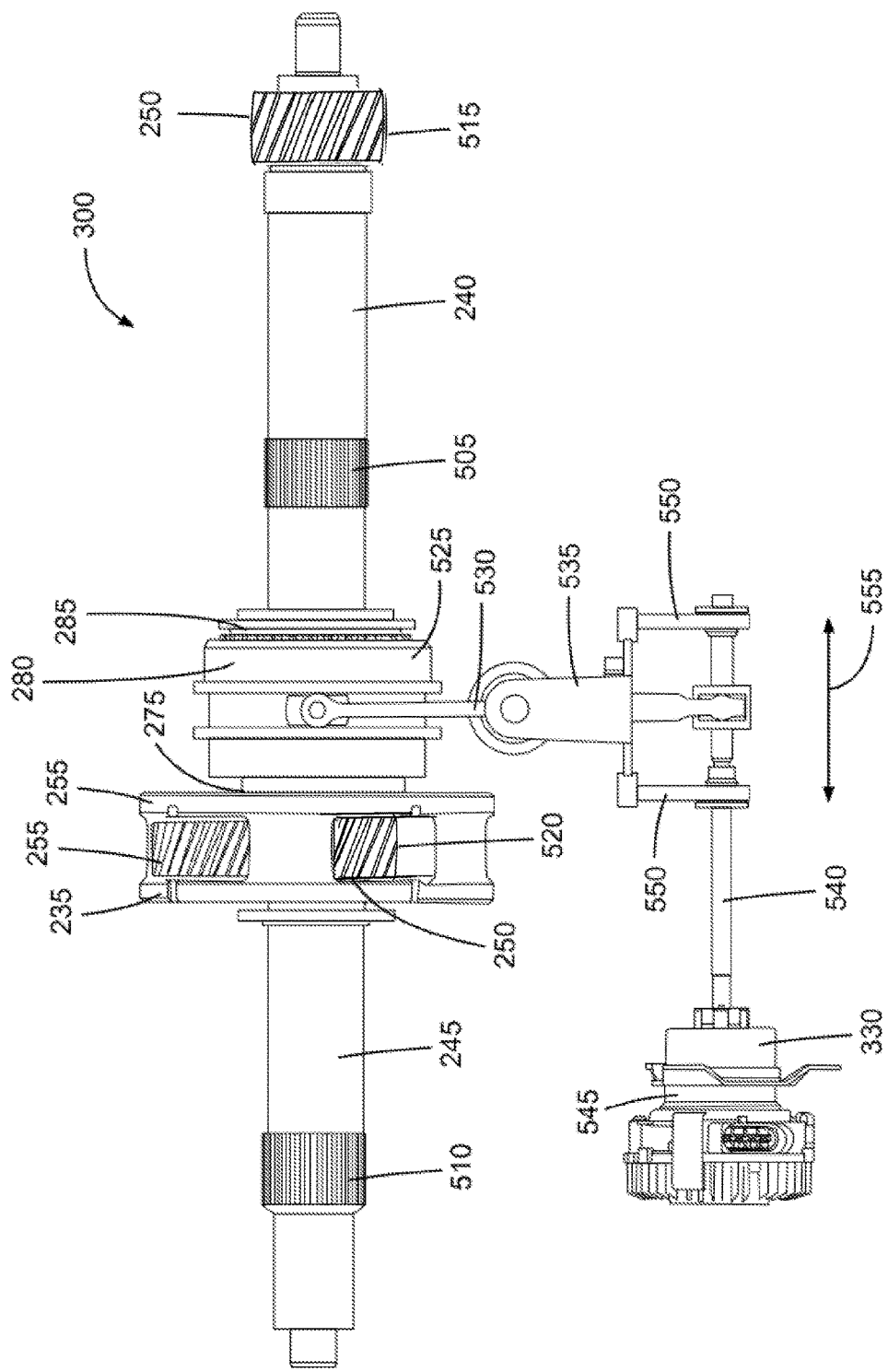
FIG. 5 is a side view of a portion of an electric motor transmission found in the FIG. 2 electric powertrain.

FIG. 5 shows a side view of the electric motor transmission 300 with selected components, such as the first electric motor 210 and second electric motor 215, removed to enhance visibility of other components. As can be seen, the first output shaft 240 has one or more first motor engagement splines 505 where the first electric motor 210 is secured to the first output shaft 240, and the second output shaft 245 has one or more second motor engagement splines 510 where the second electric motor 215 is secured to the second output shaft 245. The sun gear 250 on the first output shaft 240 for the first gear train 220 includes one or more first sun gear teeth 515 configured to engage the planet gears 255 in the first planetary gear 230, and the sun gear 250 for the second gear train 225 includes one or more second sun gear teeth 520 on the second output shaft 245 configured to engage the planet gears 255 in the second planetary gear 235. In one form, the sun gears 250 are connected to their respective shafts via a spline type connection, but other types of connections and/or configurations can be used in other examples.

As can be seen, the clutch 280 includes a clutch collar 525, a clutch actuator arm assembly 530, and a clutch actuator guide bracket 535. In the illustrated example, the clutch actuator 330 includes an actuator rod 540 that extends from an actuator motor 545 that is secured to the housing 265. The controller 110 of the vehicle 100 is operatively connected to an actuator motor 545 so as to control the operation of the clutch 280. The actuator motor 545 in one form includes an electric rotary type motor, but the actuator motor 545 can include other types of motors and/or actuators in other examples such as pneumatic or hydraulic linear actuators. The clutch actuator arm assembly 530 is operatively connected between the clutch collar 525 and the actuator rod 540 of the clutch actuator 330. In particular, one end of the clutch actuator arm assembly 530 is coupled to the clutch collar 525, and the opposite end is threadedly coupled to the actuator rod 540. The clutch actuator guide bracket 535 is secured to the housing 265, and the clutch actuator arm assembly 530 is pivotally connected to the clutch actuator guide bracket 535. The clutch actuator guide bracket 535 further has one or more guide flanges 550 that support the actuator rod 540 as the actuator rod 540 rotates. The actuator rod 540 is threaded where the end of the actuator arm assembly 530 engages the actuator rod 540. This threaded connection allows the actuator motor 545 to actuate or move the actuator arm assembly 530 by rotating the actuator rod 540. As indicated by double arrow 555 in FIG. 5, the actuator motor 545 of the clutch actuator 330 is configured to move or actuate the end of the actuator arm assembly 530 by rotating the actuator rod 540 in a clockwise or counterclockwise direction. By moving the actuator arm assembly 530 in such a manner, the controller 110 is able to move the clutch collar 525 of the clutch 280 between first gear, neutral, and second gear shifting positions.

Figure 6:
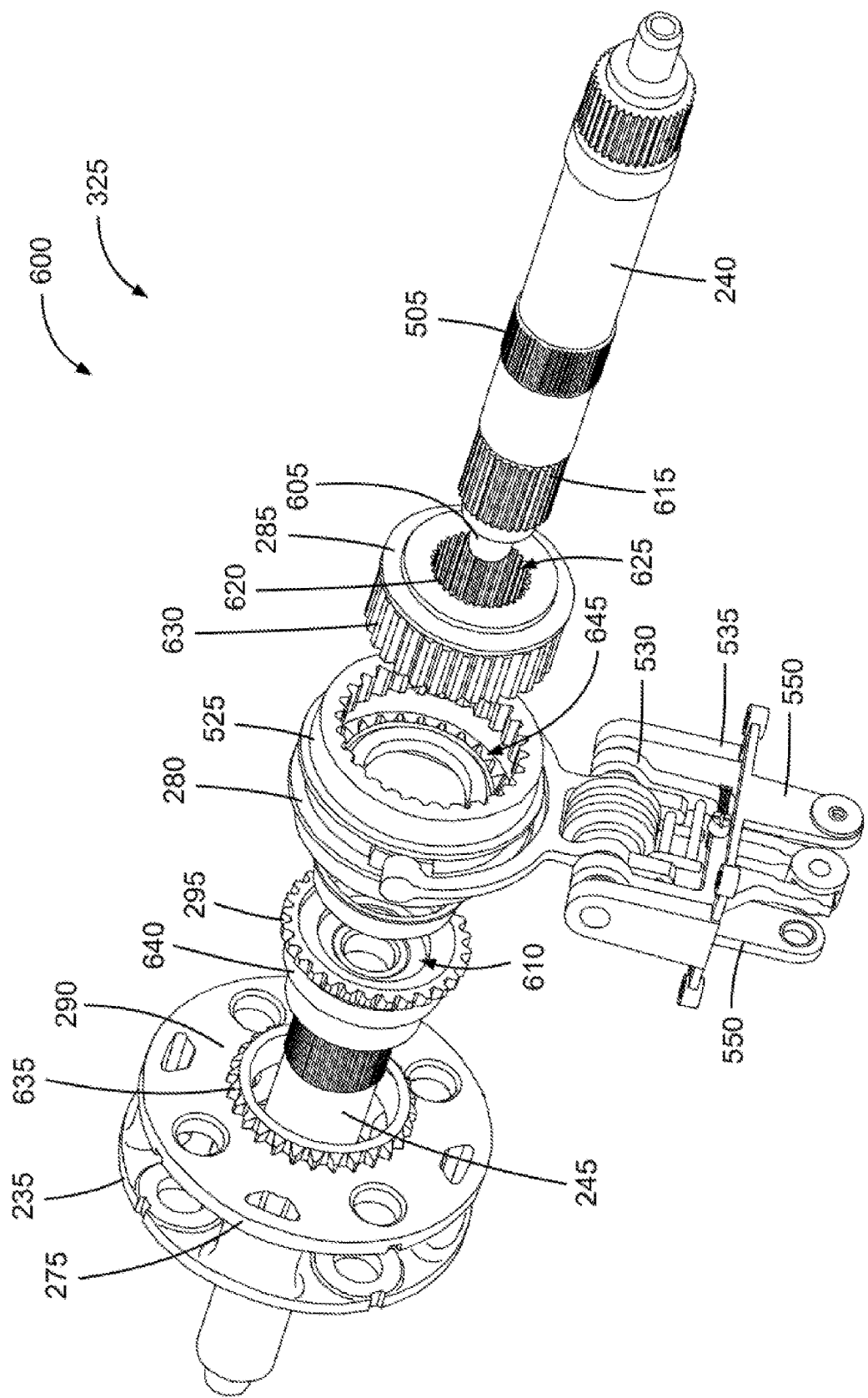
FIG. 6 is an exploded view of a clutch-shaft assembly in the FIG. 2 electric powertrain.

FIG. 6 shows an exploded of a clutch-shaft assembly 600 used in the electric powertrain 200. As shown, the first output shaft 240 has an alignment pin 605 that is received in an alignment pin cavity 610 in the second output shaft 245 to align the first output shaft 240 with the second output shaft 245. Opposite the end with the first sun gear teeth 515, the first output shaft 240 has one or more clutch engagement member splines 615 configured to engage with one or more first shaft engagement splines 620 located around a first shaft opening 625 inside the clutch engagement member 285. This engagement between the clutch engagement member splines 615 and first shaft engagement splines 620 secures the clutch engagement member 285 to the first output shaft 240 so as to facilitate torque transfer from the clutch engagement member 285 to the first output shaft 240.

Around the circumferential exterior, the clutch engagement member 285 has one or more collar engagement teeth 630 configured to engage with the clutch collar 525 of the clutch 280. The first range member 290 on the second carrier 275 of the second planetary gear 235 has one or more first range member teeth 635 configured to selectively engage with the clutch collar 525 of the clutch 280, and the second range member 295 on the second output shaft 245 has one or more second range member teeth 640 configured to selectively engage with the clutch collar 525. As depicted, the clutch collar 525 defines a collar cavity 645 where the collar engagement teeth 630 of the clutch engagement member 285, the first range member 290 of the second planetary gear 235, and the second range member teeth 640 of the second output shaft 245 are received to engage with the clutch collar 525.

Figure 7:
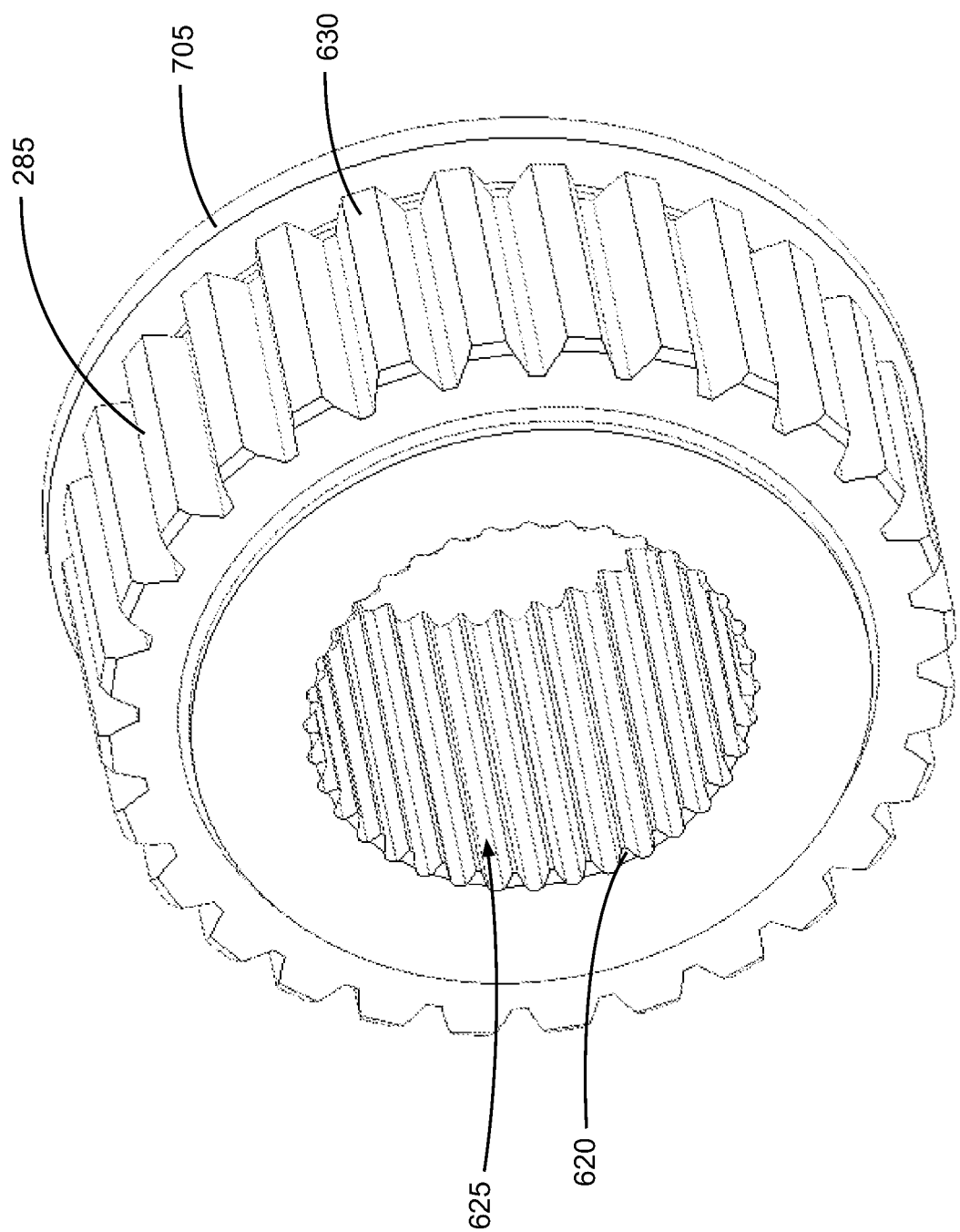
FIG. 7 is a perspective view of a clutch engagement member in the FIG. 6 clutch-shaft assembly.

FIG. 7 shows a perspective view of the clutch engagement member 285. To position the clutch engagement member 285 in the collar cavity 645 of the clutch collar 525, the clutch engagement member 285 has a collar alignment flange 705 extending in an outer circumferential direction. The collar alignment flange 705 on the clutch engagement member 285 inhibits the clutch collar 525 from moving too far along the clutch engagement member 285.

Figure 8:
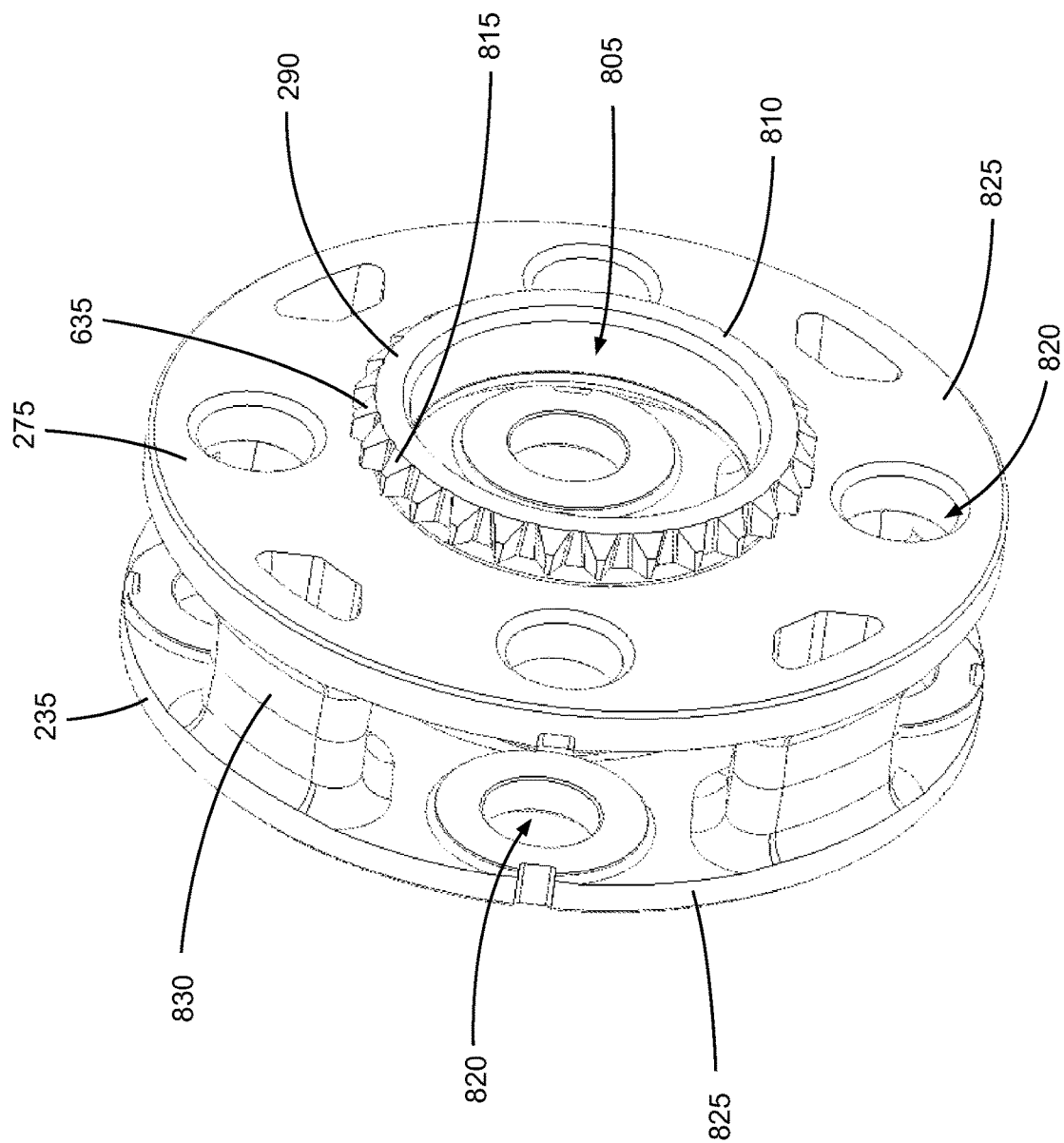
FIG. 8 is a perspective view of a second carrier in the FIG. 6 clutch-shaft assembly.

Turning to FIG. 8, the first range member 290 of the second carrier 275 defines a second shaft opening 805 through which the second output shaft 245 extends. Around the second shaft opening 805, the first range member teeth 635 extend radially outward from a teeth support rib 810. Each first range member tooth 635 has a clutch facing surface 815 that is substantially flat and beveled away from clutch collar 525 when the clutch-shaft assembly 600 is assembled. The second carrier 275 further has planet pin openings 820 in which the pins for the planet gears 255 are secured. The planet pin openings 820 are formed in opposing flanges 825 that are spaced apart by one or more posts or spacers 830. When the second planetary gear 235 is assembled, the planet gears 255 are located in the space between the flanges 825.

Figure 9:
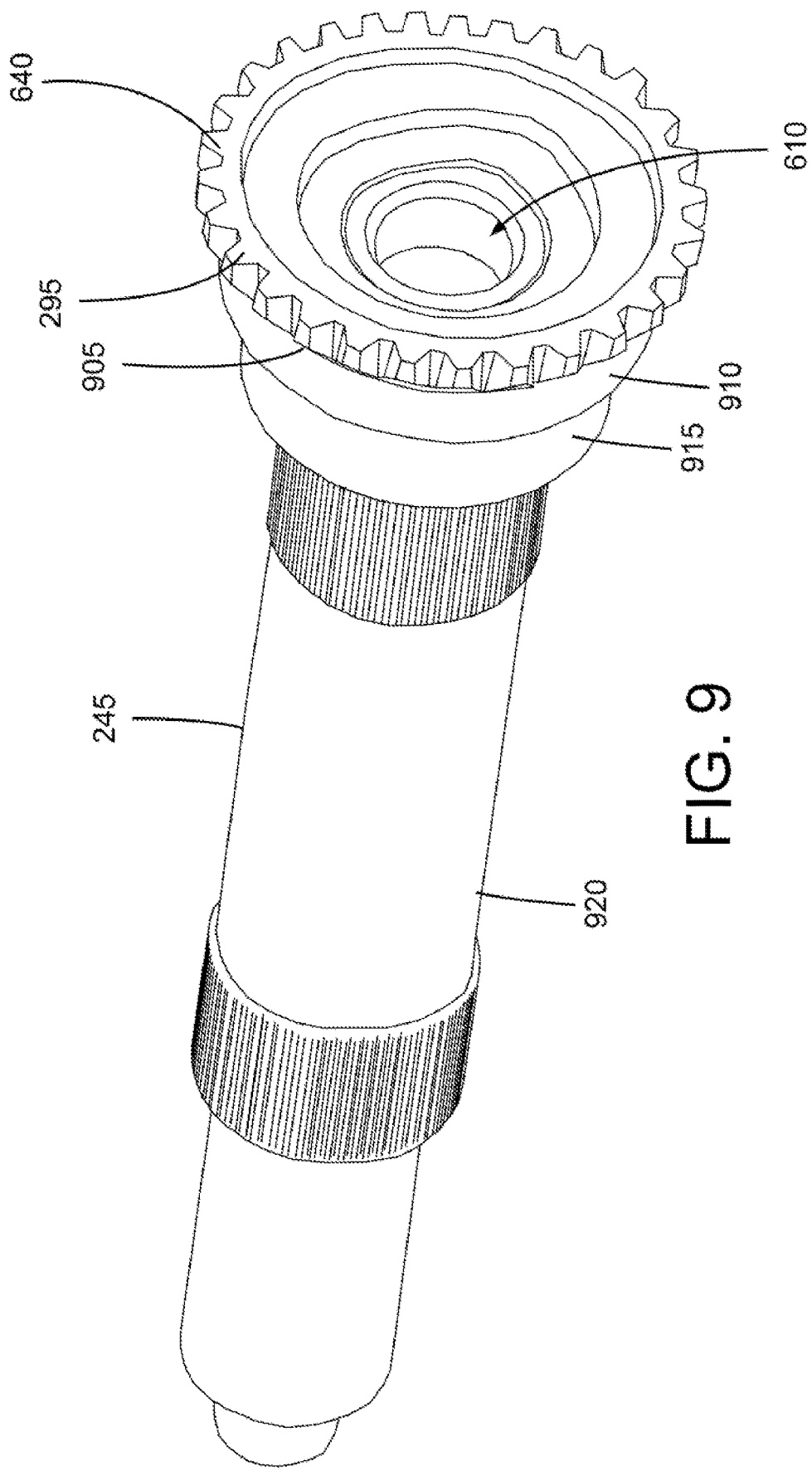
FIG. 9 is a perspective view of a second output shaft in the FIG. 6 clutch-shaft assembly.

As illustrated in FIG. 9, the second range member teeth 640 on the second output shaft 245 each have a clutch facing surface 905 that is substantially flat and beveled away from the clutch collar 525 when the clutch-shaft assembly 600 is assembled. The second output shaft 245 further has a spacer flange 910 that spaces the first range member teeth 635 of the second planetary gear 235 away from the second range member 295 of the second output shaft 245. In particular, when the transmission 205 is assembled, the spacer flange 910 of the second output shaft 245 engages the teeth support rib 810 of the second planetary gear 235. To radially align the second output shaft 245 with the second carrier 275 of the second planetary gear 235, the second output shaft 245 has a carrier race 915 that is received in the second shaft opening 805 at the teeth support rib 810 of the second carrier 275. As can be seen, the carrier race 915 has a diameter that is smaller than the diameter of the spacer flange 910 and larger than a motor engaging section 920 of the second output shaft 245.

Figure 10:
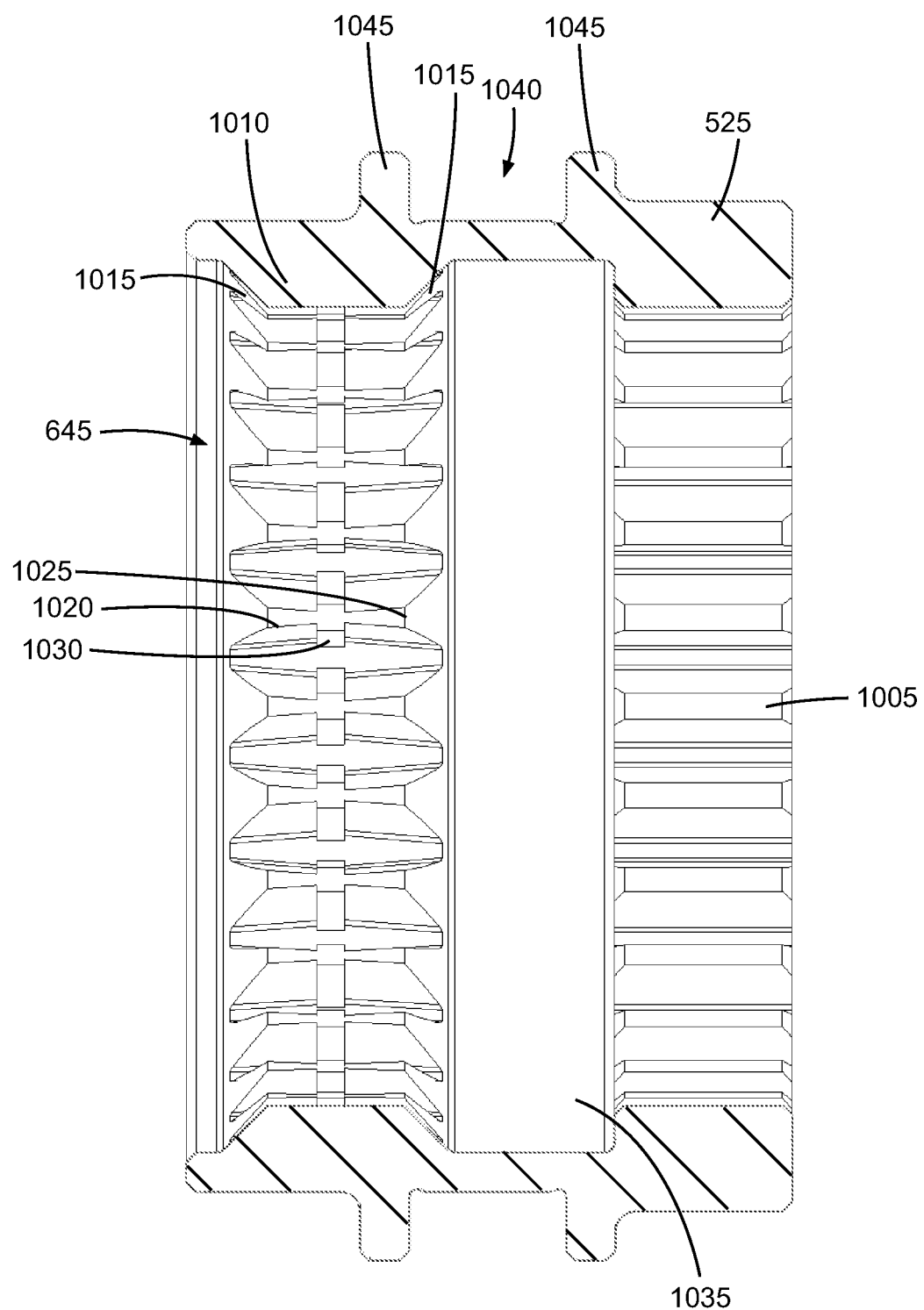
FIG. 10 is a cross-sectional view of a clutch collar in the FIG. 6 clutch-shaft assembly.

FIG. 10 shows an enlarged cross-sectional view of the clutch collar 525. As depicted, the clutch collar 525 has one or more collar teeth 1005 arranged circumferentially around the collar cavity 645. The collar teeth 1005 generally extend around the longitudinal axis 305 in a parallel manner. The collar teeth 1005 are configured mesh with the collar engagement teeth 630 on the clutch engagement member 285 in order to transfer torque from the clutch collar 525 to the first output shaft 240. The collar teeth 1005 on the clutch collar 525 are sized to remain engaged with the collar engagement teeth 630 on the first shaft opening 625 as the clutch collar 525 is moved along the longitudinal axis 305 during shifting.

Opposite the collar teeth 1005 inside the clutch collar 525, the clutch collar 525 has one or more shifting teeth 1010 arranged circumferentially around the collar cavity 645. The shifting teeth 1010 generally extend around the longitudinal axis 305 in a parallel manner. Each shifting tooth 1010 has opposing beveled surfaces 1015 that are substantially flat and beveled. The beveled surfaces 1015 are generally beveled in the same manner to correspond with the beveling of the clutch facing surface 815 on the first range member teeth 635 of the second planetary gear 235 and the clutch facing surface 905 of the second range member teeth 640 on the second range member 295. This beveling allows the clutch collar 525 to sit against a mating face so as to create a ratcheting type interface during engagement. The beveled interface during this ratcheting motion in turn creates a radial centering force vector rather than a longitudinal force vector that normally would cause that engaging clutch part to longitudinally separate. The shifting teeth 1010 further each has a first range portion 1020, a second range portion 1025, and a range separator tab 1030 positioned between the first range portion 1020 and second range portion 1025.

When engaged, the first range member teeth 635 of the second planetary gear 235 are configured to engage the shifting teeth 1010 at the first range portion 1020, and the second range member teeth 640 of the second output shaft 245 are configured to engage the shifting teeth 1010 at the second range portion 1025. For example, the first range member teeth 635 engage the first range portion 1020 of the shifting teeth 1010 when the clutch collar 525 of the clutch 280 is positioned at a first range shifting position, and the second range member teeth 640 of the second range member 295 engage the second range portion 1025 of the shifting teeth 1010 when the clutch collar 525 is positioned at a second range shifting position.

Between the collar teeth 1005 and the shifting teeth 1010 inside the collar cavity 645, the clutch collar 525 has a second range disengagement race 1035 that is substantially smooth (e.g., the second range disengagement race 1035 lacks gear teeth). When the clutch collar 525 is longitudinally positioned so that the shifting teeth 1010 are disengaged from the second range member teeth 640 on the second range member 295 (e.g., when in a first range or neutral shift positions), the second range member teeth 640 of the second output shaft 245 are located at the second range disengagement race 1035. With the second range member teeth 640 in the second range disengagement race 1035, the second range member 295 is disengaged from the clutch collar 525.

On the outer peripheral surface, the clutch collar 525 defines a shift fork groove 1040 where the clutch actuator arm assembly 530 (FIG. 5) engages the clutch collar 525. In the illustrated example, the shift fork groove 1040 is defined between one or more fork groove flanges 1045 located on opposing sides of the shift fork groove 1040. Through the shift fork groove 1040, the clutch actuator arm assembly 530 is able to longitudinally position the clutch collar 525 along the longitudinal axis 305 so that the clutch 280 is able to shift between the first, second, and neutral range positions.

Figure 11:
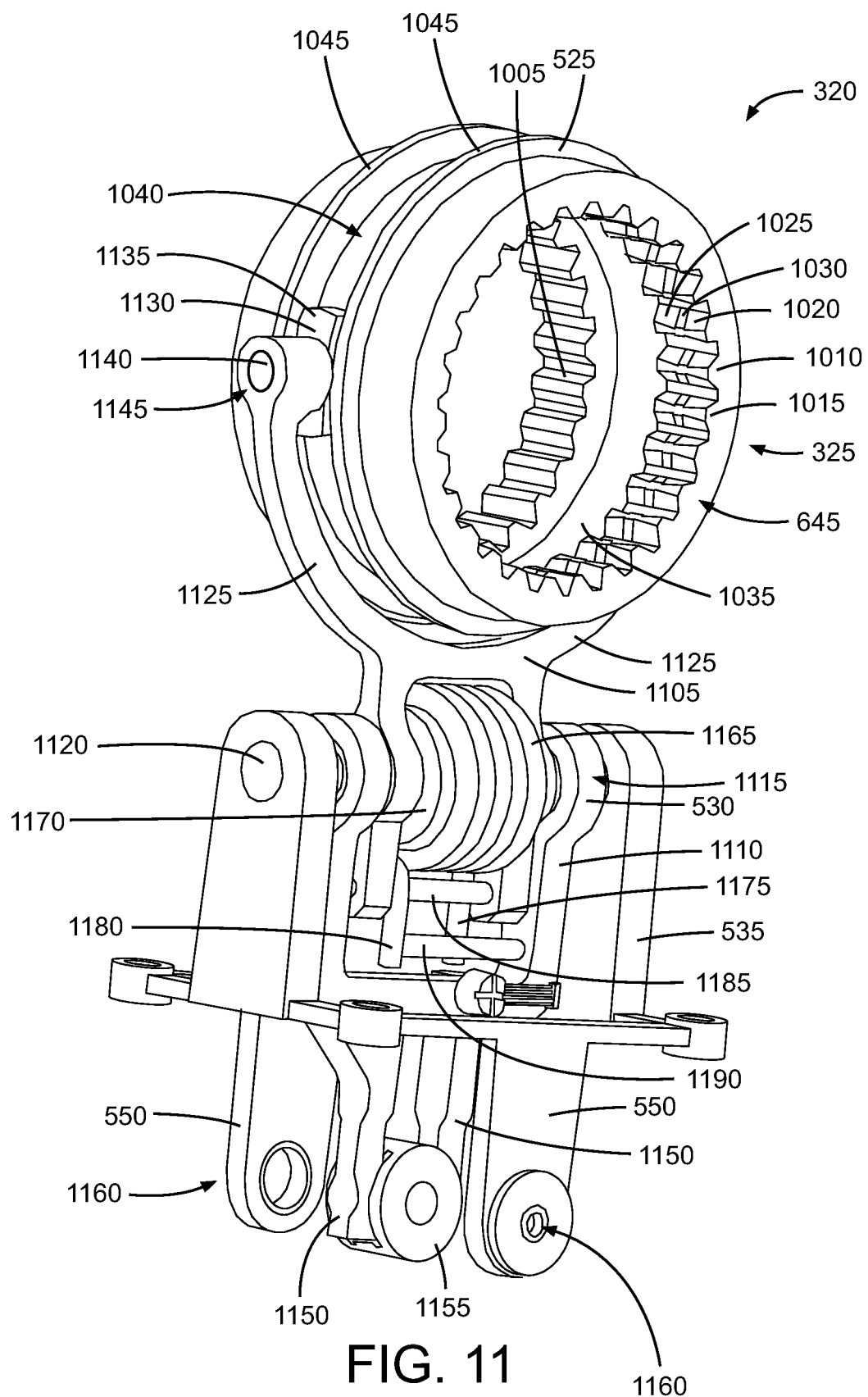
FIG. 11 is a perspective view of a dog clutch in the FIG. 6 clutch-shaft assembly.

Referring now to FIG. 11, the clutch actuator arm assembly 530 includes a shift fork 1105, a fork actuator arm 1110, and a clutch suspension 1115 that couples the shift fork 1105 to the fork actuator arm 1110. As mentioned before, some common dog clutch designs utilize a synchronizer to match speeds between engaged components. Synchronizers typically rely on a frictional interface between the clutch components in order to match speeds before the dog clutch teeth are engaged. This friction however reduces the overall energy efficiency which can be especially problematic for electric powertrains. Synchronizers also typically require large forces to create enough torque in order to synchronize the velocities of the two engaging clutch components. These large requisite forces are hard to achieve through small electric actuators.

As can be seen, the clutch 280 in the illustrated example does not include a synchronizer. Instead, the first electric motor 210 and the second electric motor 215 provide motor shaft speed and orientation information from internal resolvers 217 and/or other sensors of the motors, and based on this information, the controller 110 controls the operation of the clutch 280 so that the components of the clutch 280 are properly oriented during shifting. With the clutch 280 being a positive clutch without a synchronizer like the dog clutch 325 in the illustrated example, there are still risks of significant damage to the clutch 280 as well as other components if the components of the clutch 280 are not properly oriented during shifting and engagement. The clutch suspension 1115 compliantly couples the shift fork 1105 to the fork actuator arm 1110 to compensate for and absorb shock when the fork actuator arm 1110 of the clutch collar 525 is not directly aligned with the first range member teeth 635 or second range member teeth 640. In other words, the clutch suspension 1115 allows the clutch actuator arm assembly 530 to bend or deflect during actuation to reduce damage to the clutch collar 525 as well as other components of the dog clutch 325. This compliance further allows the end of the clutch actuator arm assembly 530 that is coupled to the actuator rod 540 to be fully stroked, thereby preventing stalling and/or overheating of the actuator motor 545. Clutch actuation control is also easier because the clutch suspension 1115 can be tuned to only allow engagement at certain differential velocities or within certain differential velocity ranges.

In the illustrated example, the clutch suspension 1115 is operatively coupled between the shift fork 1105 and the fork arms 1125 of the clutch actuator arm assembly 530, but it should be recognized that the clutch suspension 1115 can be positioned elsewhere within the clutch 280. The clutch actuator arm assembly 530 further includes a pivot pin 1120 coupled to the clutch actuator guide bracket 535. The pivot pin 1120 pivotally connects the shift fork 1105, fork actuator arm 1110, and the clutch suspension 1115 to the clutch actuator guide bracket 535. Once more, the clutch suspension 1115 couples the shift fork 1105 to the fork actuator arm 1110, and as shown, the clutch suspension 1115 is located proximal to the pivot pin 1120.

At an end opposite to the pivot pin 1120, the shift fork 1105 has one or more fork arms 1125 that are coupled to the clutch collar 525. The shift fork 1105 in the depicted example includes two (2) fork arms 1125 that form a U-shape. The shift fork 1105 in other examples can have more or less fork arms 1125 than is shown, and the fork arms 1125 can have different shapes. The fork arms 1125 further have one or more guide pads 1130 pivotally coupled to the end of each fork arms 1125. The guide pads 1130 are slidably disposed in the shift fork groove 1040 of the clutch collar 525 to allow the clutch collar 525 to rotate or spin relative to the shift fork 1105. Each guide pad 1130 has a pad body 1135 located inside the shift fork groove 1040 and a pad pin 1140 that extends from the pad body 1135. As shown, the pad body 1135 has a substantially rectangular shape. Each fork arm 1125 has a pin opening 1145 where the pad pin 1140 is pivotally received. This pivotal engagement allows the clutch collar 525 to remain aligned with the longitudinal axis 305 as the clutch actuator arm assembly 530 is pivoted to move or shift the clutch collar 525.

Opposite the fork arms 1125 of shift fork 1105, the fork actuator arm 1110 has one or more clip arms 1150 that are secured to an actuator rod collar 1155. The actuator rod collar 1155 is threadedly secured to the actuator rod 540 of the clutch actuator 330 (FIG. 5). Through this threaded engagement between the actuator rod 540 and the actuator rod collar 1155, the clutch actuator 330 is able to actuate the clutch collar 525 by pivoting the clutch actuator arm assembly 530. As shown in FIG. 11, the guide flanges 550 each has one or more rod guide openings 1160 for maintaining the alignment of the actuator rod 540 as the actuator rod 540 rotates. As shown, the guide flanges 550 are positioned transverse (e.g., perpendicular) to the pivot pin 1120. This arrangement allows the clutch actuator 330 to pivot the clutch actuator arm assembly 530 relative to the pivot pin 1120.

In the example illustrated in FIG. 11, the clutch suspension 1115 includes a torsion spring 1165 that is wrapped around a spring collar 1170. The torsion spring 1165 has a shift fork end 1175 that engages the shift fork 1105 and an actuator arm end 1180 that engages the fork actuator arm 1110. As shown, the shift fork 1105 has a fork cross pin 1185 against which the shift fork end 1175 of the torsion spring 1165 engages. The fork actuator arm 1110 has an actuator cross pin 1190 against which the actuator arm end 1180 of the torsion spring 1165 engages. The torsion spring 1165 is designed to normally keep the shift fork 1105 and fork actuator arm 1110 aligned in a straight line. However, the clutch suspension 1115 through the torsion spring 1165 is able to create a non-rigid or flexible connection between the shift fork 1105 and the fork actuator arm 1110 so as to minimize damage to the clutch 280. For example, when the clutch actuator 330 applies a force to the fork actuator arm 1110 that exceeds a predetermined threshold (e.g., the spring force for the torsion spring 1165), the shift fork 1105 will bend or flex such that the shift fork 1105 and fork actuator arm 1110 will have a bent orientation. In other words, the clutch actuator arm assembly 530 yields or bends to reduce potential damage to the clutch 280. This for example can occur when the shifting teeth 1010 of the clutch collar 525 are not properly aligned with the first range member teeth 635 or second range member teeth 640 during shifting. When this occurs, the clutch collar 525 is able to bounce away from the engagement or chatter until the shifting teeth 1010 of the clutch collar 525 are able to properly mesh with the first range member teeth 635 or second range member teeth 640.

This ability of the clutch suspension 1115 to bend or flex is especially useful for positive clutches 320 like the illustrated dog clutch 325, because positive clutches 320 are typically designed to engage with no or minimal slippage. The slippage for instance provided by disc type clutches during engagement provides sufficient tolerance to minimize damaging jolts or impacts, but this slippage wastes energy during shifting which in turn makes such clutches less desirable for electric motor designs such as those described above. With little or no slippage, little energy is lost due to friction or other energy drain sources during shifting of positive clutches 320 which is desirable for the powertrain system 105 described above. However, positive clutches 320 have no such tolerances and thus are prone to damage. The clutch suspension 1115 facilitates the use of energy efficient dog clutches 325 for the powertrain system 105 illustrated in the drawings.

Figure 12:
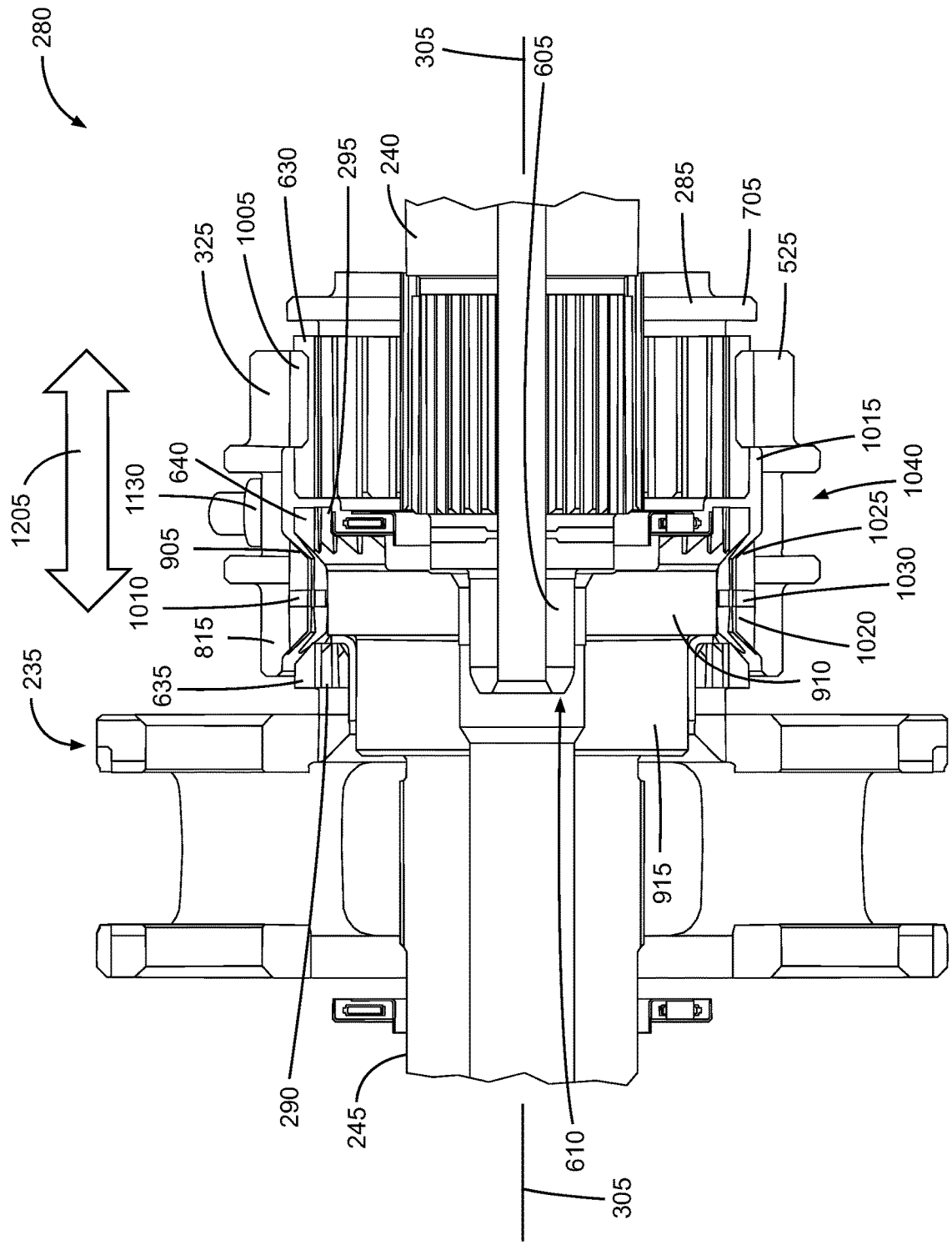
FIG. 12 is a partial cross-sectional view of the clutch during use.

A technique for operating the clutch 280 will now be described with reference to FIGS. 5, 11, and 12. FIG. 12 shows an enlarged cross-sectional view of the clutch 280 when the clutch collar 525 is positioned at a neutral position. As can be seen, the shifting teeth 1010 when in the neutral position are located over the spacer flange 910 of the second output shaft 245, and the shifting teeth 1010 on the clutch collar 525 are disengaged from the first range member teeth 635 on the second planetary gear 235 and the second range member teeth 640 on the second output shaft 245. Once more, the first range member teeth 635 and the second range member teeth 640 respectively have clutch facing surfaces 815 and clutch facing surfaces 905 that are beveled or angled to coincide with the beveled surfaces 1015 on the shifting teeth 1010 so as to provide clearance to reduce the risk of damage when in the neutral position and enhance engagement during shifting.

Referring to FIGS. 11 and 12, the clutch collar 525 rotates in unison with the first output shaft 240 due to the engagement between the collar engagement teeth 630 of the first output shaft 240 with the collar teeth 1005 of the clutch collar 525. As indicated by double arrow 1205 in FIG. 12, the clutch collar 525 is able to slide relative to the first output shaft 240 along the longitudinal axis 305. This sliding movement is used to facilitate shifting. At all times during this longitudinal sliding movement, the collar teeth 1005 of the clutch collar 525 remain engaged with the collar engagement teeth 630 of the first output shaft 240. For example, the clutch collar 525 is able to transfer torque from the second output shaft 245 to the first output shaft 240 when the clutch 280 is engaged with the first range member 290 or second range member 295. No torque is transferred when the clutch collar 525 is in the neutral position shown in FIG. 12, though the collar teeth 1005 of the clutch collar 525 remain engaged with the collar engagement teeth 630 of the first output shaft 240.

While the clutch collar 525 rotates in unison with the first output shaft 240, the guide pads 1130 of the clutch actuator arm assembly 530 slide within the shift fork groove 1040 of the clutch collar 525. Looking at FIGS. 5 and 12, as the actuator motor 545 of the clutch actuator 330 moves the actuator rod 540 in the directions indicated by the double arrow 555 in FIG. 5, the clutch actuator arm assembly 530 via the guide pads 1130 causes the clutch collar 525 to move in the longitudinal directions indicated by the double arrow 1205 in FIG. 12. For example, the controller 110 can send a signal to the clutch actuator 330 in order to shift the clutch 280 from the neutral position to the first shift range position. In response, the actuator rod 540 of the clutch actuator 330 extends farther away from the actuator motor 545, and the clutch actuator arm assembly 530 pivots about the pivot pin 1120 (FIG. 11) such that the guide pads 1130 causes the clutch collar 525 to slide towards the second planetary gear 235 to engage the first range member 290 of the second output shaft 245. Based on positional, speed, and other information from the resolvers 217 or other sensors in the first electric motor 210 and second electric motor 215, the controller 110 is able to determine the relative velocity and/or orientation of the first range member teeth 635 on the second planetary gear 235 and the shifting teeth 1010 on clutch collar 525 to ensure that the first range member teeth 635 and shifting teeth 1010 engage or mesh properly.

As mentioned before, the clutch engagement member 285 in the illustrated example does not include a synchronizer in order to reduce energy loss during shifting. This further reduces overall system cost and complexity. The clutch suspension 1115 in the clutch actuator arm assembly 530 allows the shift fork 1105 to bend or deflect relative to the fork actuator arm 1110 which in turn reduces the risk of damage to the shifting teeth 1010 of the clutch collar 525 when the shifting teeth 1010 are misaligned or not properly meshed with the first range member teeth 635. Once the first range portions 1020 of the shifting teeth 1010 in the clutch collar 525 are meshed with the first range member teeth 635 of the first range member 290, the clutch collar 525 is able to transfer the torque of the second electric motor 215 from the second planetary gear 235 to the first output shaft 240. When the clutch 280 is engaged to the second planetary gear 235 in this first shift range position, the torque supplied from the second electric motor 215 to the first output shaft 240 is typically higher and the speed is typically lower as compared to when the second electric motor 215 is operating the same operating under conditions at the second shift range position. The clutch collar 525 can return to the neutral position depicted in FIG. 12 by retracting the actuator rod 540 relative to the actuator motor 545.

As another example, the controller 110 can send a signal to the clutch actuator 330 in order to shift the clutch 280 from the neutral position to the second shift range position. Again, based on positional, speed, and other information from the resolvers 217 or other sensors in the first electric motor 210 and second electric motor 215, the controller 110 is able to determine the relative velocity and/or orientation of the second range member teeth 640 on the second output shaft 245 and the shifting teeth 1010 on clutch collar 525 to ensure that the second range member teeth 640 and shifting teeth 1010 engage or mesh properly when shifting to the second gear range. In response to the signal to shift, the actuator rod 540 of the clutch actuator 330 retracts towards the actuator motor 545, and the clutch actuator arm assembly 530 pivots about the pivot pin 1120 (FIG. 11) such that the guide pads 1130 causes the clutch collar 525 to slide towards the second range member 295 to engage the second range member teeth 640 of the second range member 295. Again, the clutch suspension 1115 in the clutch actuator arm assembly 530 allows the shift fork 1105 to bend or deflect relative to the fork actuator arm 1110 which in turn reduces the risk of damage to the shifting teeth 1010 of the clutch collar 525 when the shifting teeth 1010 are misaligned or not properly meshed with the second range member teeth 640. Once the second range portions 1025 of the shifting teeth 1010 in the clutch collar 525 are meshed with the second range member teeth 640 of the second range member 295, the clutch collar 525 is able to transfer the torque of the second electric motor 215 from the second output shaft 245 to the first output shaft 240. When the clutch 280 is engaged to the second planetary gear 235 in this second shift range position, the torque supplied from the second electric motor 215 to the first output shaft 240 is typically lower and the speed is typically higher as compared to when the second electric motor 215 is operating under the same operating conditions at the first shift range position. The clutch collar 525 can return to the neutral position depicted in FIG. 12 by extending the actuator rod 540 relative to the actuator motor 545.

It should be recognized that the clutch suspension 1115 can be configured differently in other examples. For instance, the clutch suspension 1115 can be located elsewhere in the clutch 280 and/or use other types of mechanisms. Some other non-limiting examples of the clutch suspension 1115 that can be used in the clutch 280 will now be described with reference to FIGS. 13, 14, and 15.

Figure 13:
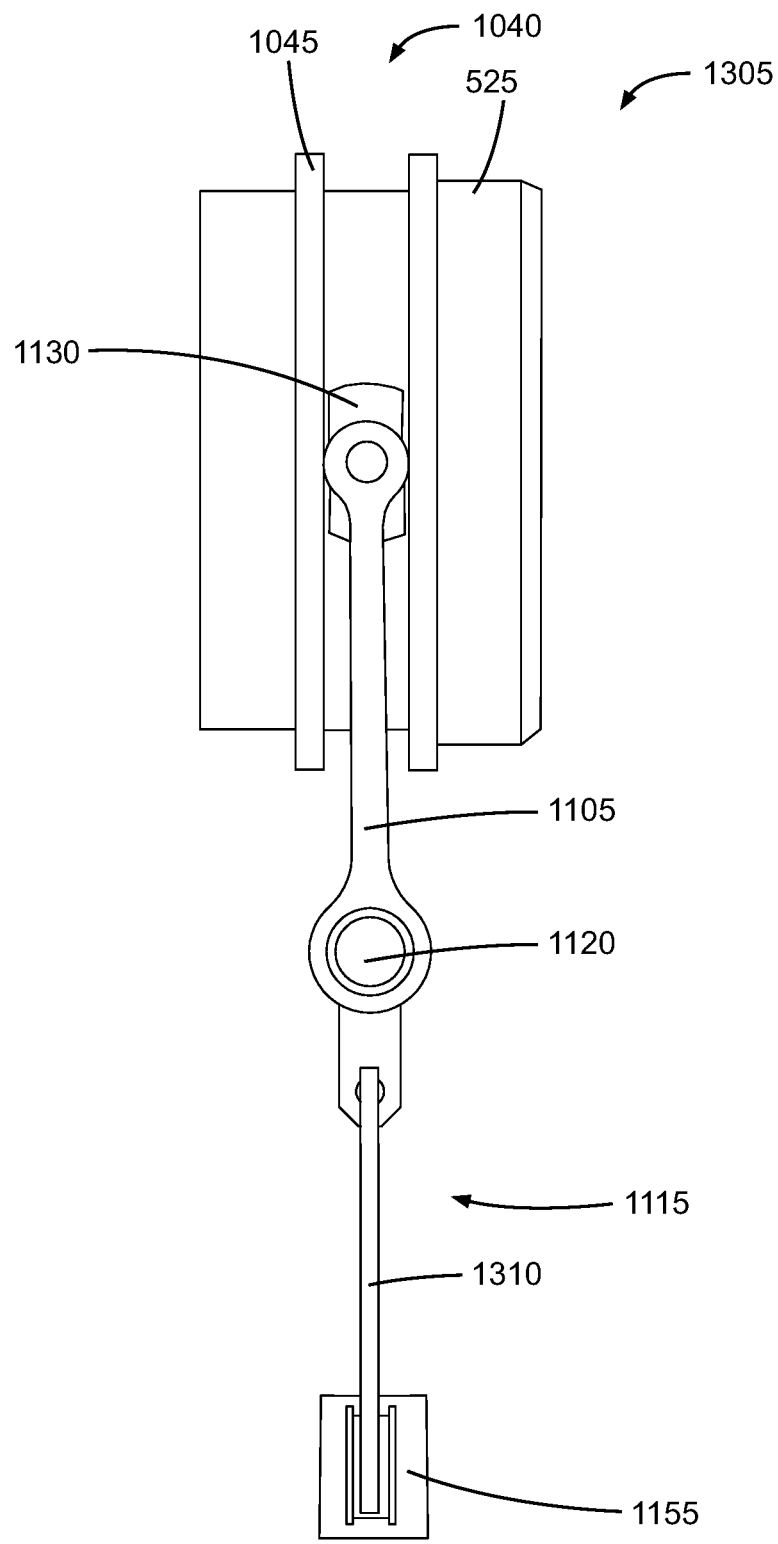
FIG. 13 is a side view of another example of a dog clutch with a leaf spring that can be used in the FIG. 2 electric powertrain.

For instance, FIG. 13 shows a dog clutch 1305 according another example. As can be seen, the FIG. 13 dog clutch 1305 shares a number of components in common with and operates in a similar fashion as the dog clutch 325 illustrated in FIG. 11. For example, the dog clutch 1305 in FIG. 13 includes the clutch collar 525 with the shift fork groove 1040, the guide pads 1130 received in the shift fork groove 1040, the shift fork 1105, the pivot pin 1120, and the actuator rod collar 1155. For the sake of brevity and clarity, these common components and their function will not be again described in great detail below, but please refer to the previous discussion of these components. In this example, the clutch suspension 1115 includes a leaf spring 1310 connected between the actuator rod collar 1155 and the shift fork 1105. The leaf spring 1310 is configured to bend or flex when the force applied by the clutch actuator 330 exceeds a threshold level so as to reduce the risk of gear grinding and the resulting damage to the clutch collar 525 during shifting.

Figure 14:
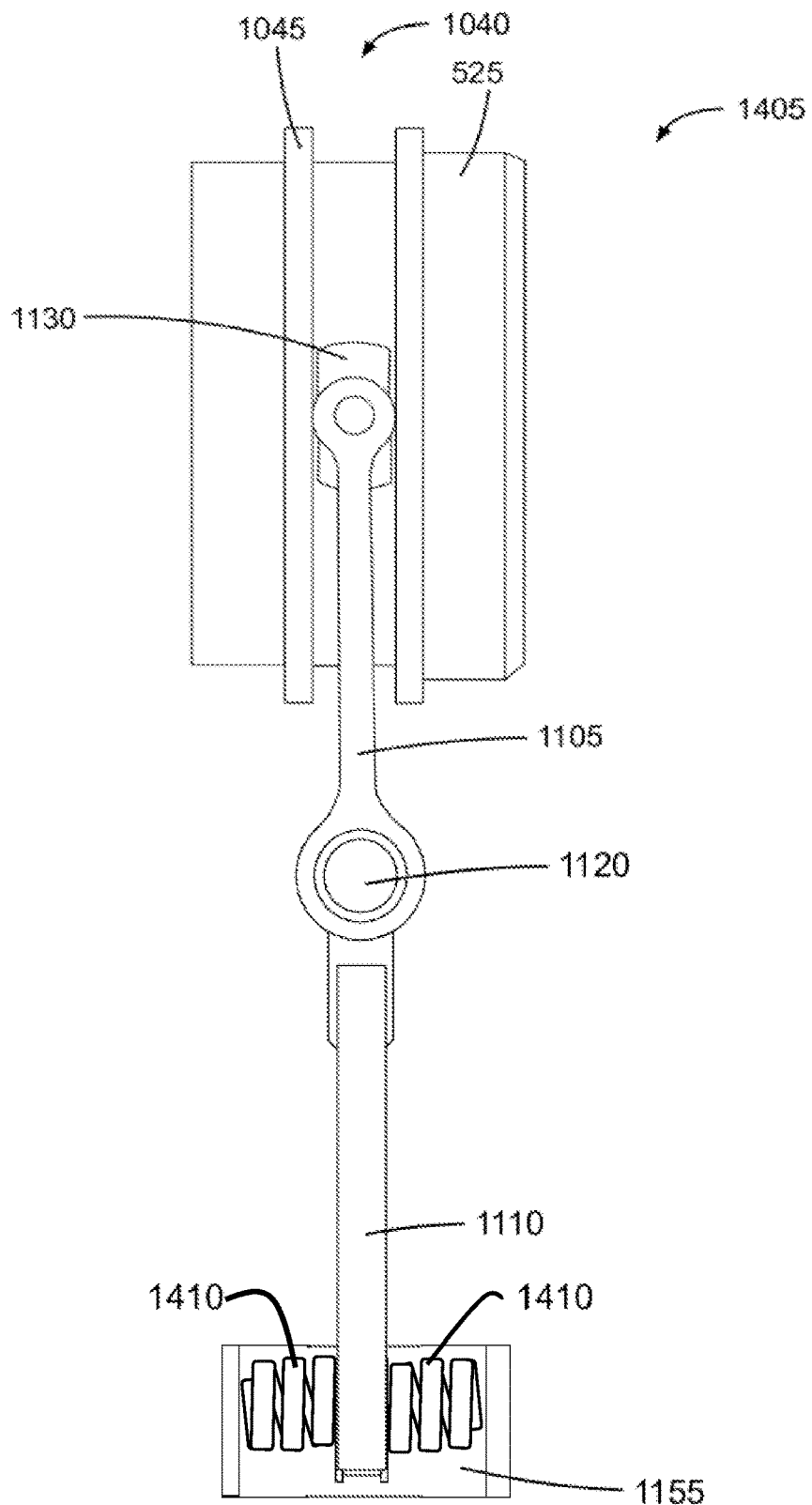
FIG. 14 is a side view of a further example of a dog clutch with a coil spring that can be used in the FIG. 2 electric powertrain.

FIG. 14 shows a dog clutch 1405 with a clutch suspension that includes one or more coil springs 1410. The coil springs 1410 are positioned on opposite sides of the fork actuator arm 1110 within the actuator rod collar 1155. The actuator rod 540 extends through the coil springs 1410. The coil springs 1410 helically wrap around the actuator rod 540, and the actuator rod 540 threadedly engages the actuator rod collar 1155 in a similar fashion as described before. In the illustrated example, the shift fork 1105 and the fork actuator arm 1110 are joined or integrally formed together to form a solid, unitary arm that pivots about the pivot pin 1120. Within the actuator rod collar 1155, the end of the fork actuator arm 1110 is sandwiched between the coil springs 1410. The coil springs 1410 are configured to stretch or compress when the force applied by the clutch actuator 330 exceeds a threshold level so as to reduce the risk of gear grinding and the resulting damage to the clutch collar 525 during shifting.

Figure 15:
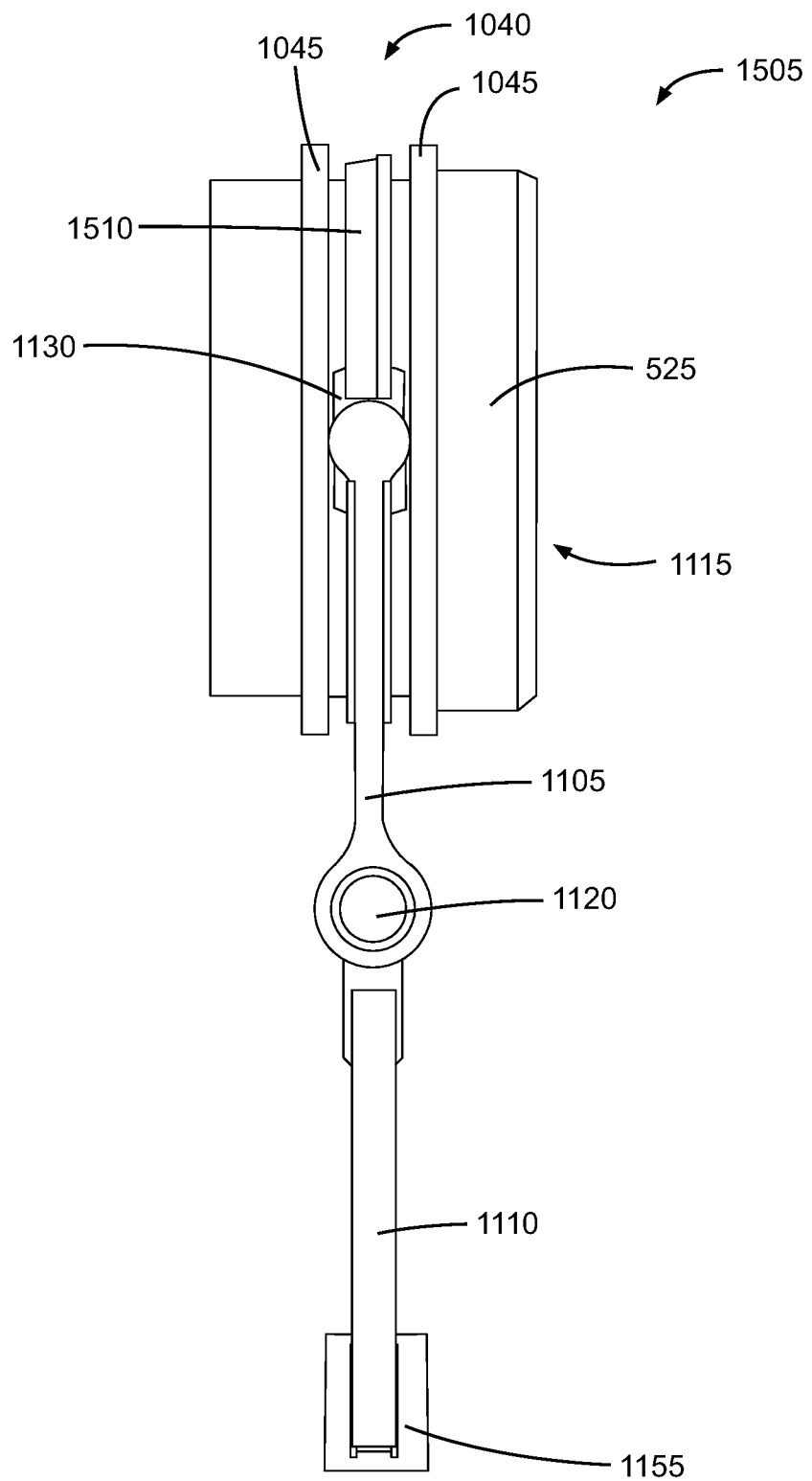
FIG. 15 is a side view of still yet another example of a dog clutch with a Belleville spring that can be used in the FIG. 2 electric powertrain.

As noted before, the clutch suspension 1115 can be positioned elsewhere in the clutch 280. For example, the coil spring 1410 can be incorporated in the actuator rod 540 (FIG. 5) to compress or stretch when the force applied by the actuator motor 545 exceeds a threshold level. As another example, the clutch suspension 1115 in a dog clutch 1505 shown in FIG. 15 is positioned between the shift fork 1105 and the guide pads 1130. The dog clutch 1505 in FIG. 15 shares a number of components in common with and operates in a similar fashion as the clutches 280 illustrated in FIGS. 11, 13, and 14. For example, the dog clutch 1305 in FIG. 13 includes the clutch collar 525 with the shift fork groove 1040, the guide pads 1130 received in the shift fork groove 1040, the shift fork 1105, the fork actuator arm 1110, the pivot pin 1120, and the actuator rod collar 1155. For the sake of brevity and clarity, these common components and their function will not be again described in great detail below, but please refer to the previous discussion of these components.

In FIG. 15, the clutch suspension 1115 includes a Belleville spring 1510 connected between the shift fork 1105 and the guide pads 1130. The spring 1510 in other examples includes a wave spring. In another variation, the guide pads 1130 are eliminated. The Belleville spring 1510 in this variation is pivotally connected to the shift fork 1105, and the Belleville spring 1510 is sized and configured so as to allow the clutch collar 525 to rotate relative to the Belleville spring 1510 while the Belleville spring 1510 is retained in the shift fork groove 1040 between the fork groove flanges 1045. In a further form, the clutch suspension 1115 includes at least two Belleville springs 1510 facing opposite directions such that the smaller frustum or conical end of each Belleville spring 1510 faces the proximal fork groove flanges 1045 so as to contact the fork groove flanges 1045 during shifting. The Belleville spring 1510 is configured to flex when the force applied by the clutch actuator 330 to the clutch collar 525 exceeds a threshold level so as to reduce the risk of gear grinding and the resulting damage to the clutch collar 525 during shifting. As compared to other spring configurations, the Belleville spring 1510 is able to provide a more concentric or even spring force to the clutch collar 525. The Belleville spring 1510 can also typically withstand greater loads within compact spaces and provide a longer service life. Other suspension variations include small leaf springs that are connected to the guide pads on the fork.

Figure 16:
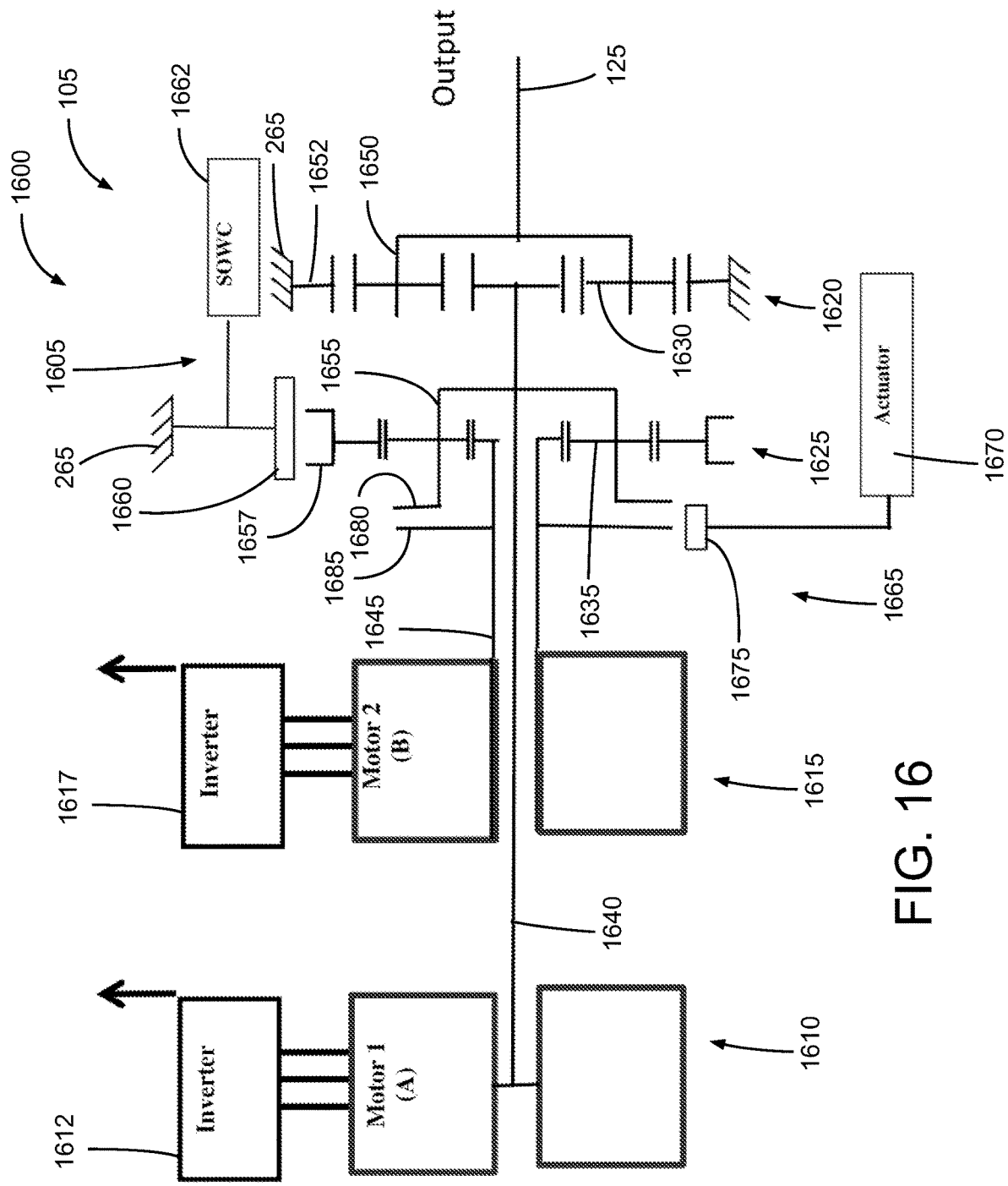
FIG. 16 is a diagrammatic view of another example of an electric powertrain that can be used in the vehicle of FIG. 1.
Figure 17:
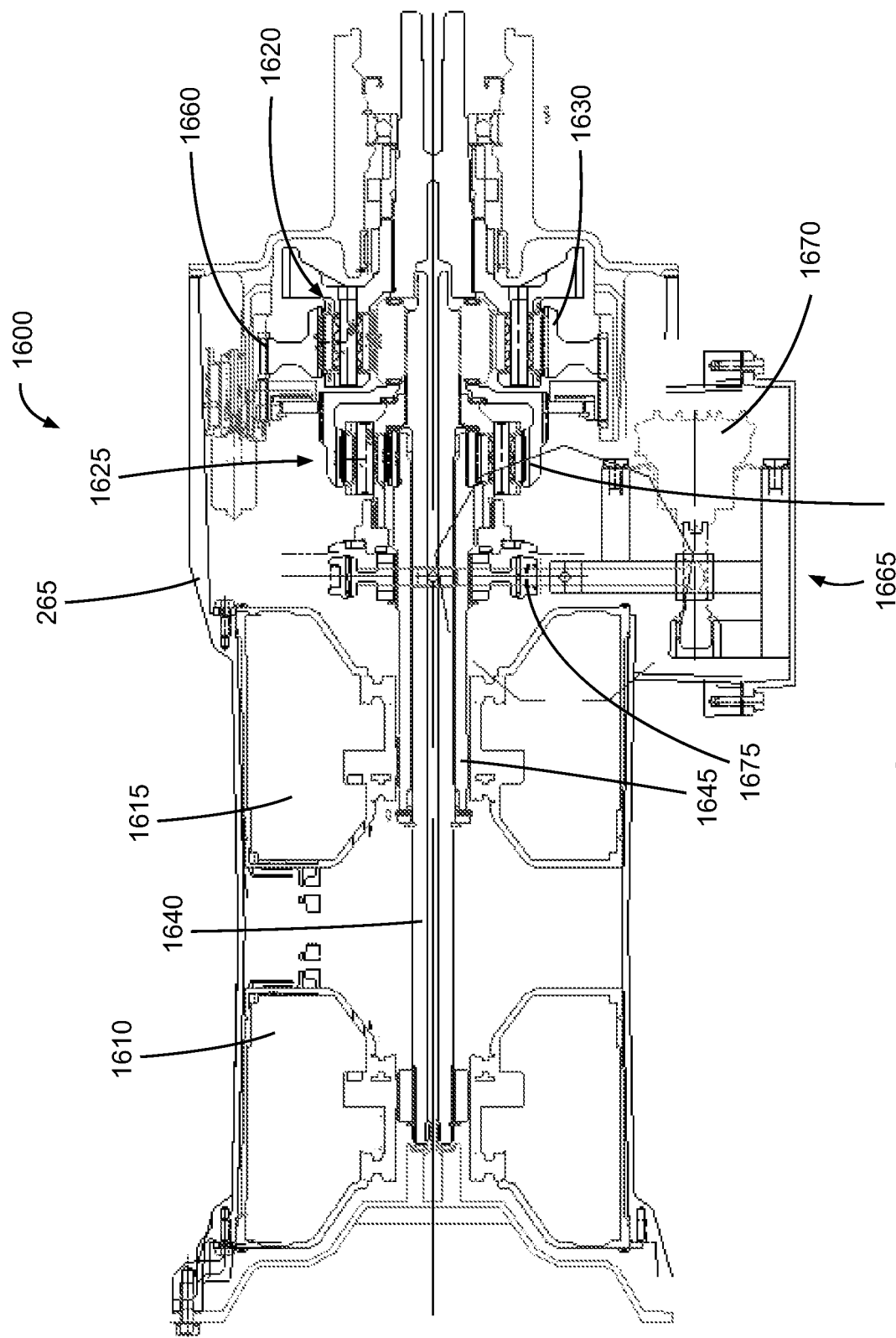
FIG. 17 is a cross-sectional view of the electric powertrain in FIG. 16.

FIG. 16 shows a diagram of another example of an electric powertrain 1600 that can be used in the powertrain system 105 of FIG. 1, and FIG. 17 shows a cross-sectional view of the electric powertrain 1600. The electric powertrain 1600 shares a number of components and functions in common with the ones described before (see e.g., FIGS. 2 and 3). For the sake of brevity as well as clarity, these common features will not be described in great detail below, but please refer to the previous discussion.

As depicted, the electric powertrain 1600 includes a multiple motor continuous power transmission 1605. The transmission 1605 of the electric powertrain 1600 includes a first electric motor 1610 with a first inverter 1612 and a second electric motor 1615 with a second inverter 1617. The first inverter 1612 is electrically connected between the ESS 115 and the first electric motor 1610, and the second inverter 1617 is electrically connected between the ESS 115 and the second electric motor 1615. The first inverter 1612 and second inverter 1617 convert the direct current (DC) from the ESS 115 to alternating current (AC) in order to power the first electric motor 1610 and second electric motor 1615, respectively. The first electric motor 1610 and second electric motor 1615 can also act as generators such as during regenerative braking. In such a situation, the first inverter 1612 and second inverter 1617 convert the AC electrical power from the first electric motor 1610 and second electric motor 1615, respectively, to DC power that is supplied to the ESS 115. In one example, the first electric motor 1610 and second electric motor 1615 are the same type of electric motor such that both motors generally provide the same speed and torque output within normal manufacturing tolerances. The first electric motor 1610 and second electric motor 1615 in one form are both high speed electric motors, and in another form, the first electric motor 1610 and second electric motor 1615 are both low speed electric motors. In alternative variations, the first electric motor 1610 and second electric motor 1615 can be different such that one for example is a high speed motor and the other is a low speed motor.

The transmission 1605 of the electric powertrain 1600 further includes a first gear train 1620 and a second gear train 1625 both located at an output end of the first electric motor 1610 and the second electric motor 1615. As can be seen, the first gear train 1620 is located at the output end of the entire transmission 1605 that is proximal to the drive shaft 125. The second gear train 1625 is sandwiched or located between the second electric motor 1615 and the first gear train 1620. This configuration helps to dampen noise created by the second gear train 1625. In the illustrated example, the first gear train 1620 includes a first planetary gear 1630, and the second gear train 1625 is includes a second planetary gear 1635. The first electric motor 1610 and second electric motor 1615 respectively have a first output shaft 1640 and a second output shaft 1645 for providing rotational mechanical power. In the illustrated example, the second output shaft 1645 is hollow such that the first output shaft 1640 is able to extend through the second output shaft 1645 in a concentric manner. Similar to the previous examples, the first planetary gear 1630 has a first carrier 1650 that is connected to the drive shaft 125 and a first ring gear 1652 that surrounds the first carrier 1650. In the illustrated example, the first ring gear 1652 is secured to the housing 265. The second planetary gear 1635 has a second carrier 1655 that is coupled to the first gear train 1620 and a second ring gear 1657 that surrounds the second carrier 1655.

As shown in FIGS. 16 and 17, the electric powertrain 1600 includes at least one Selectable One-Way Clutch ("SOWC") 1660 with a clutch actuator 1662 that engages and disengages the SOWC 1660 with the second ring gear 1657. Through the SOWC 1660, the transmission 1605 of the electric powertrain 1600 is able to shift gears such that the speed and/or torque from second electric motor 1615 can be changed. The second gear train 1625 further includes a clutch 1665 with a clutch actuator 1670 that actuates the clutch 1665. In one example, the clutch 1665 includes a dog clutch 1675, and in one particular version, the dog clutch 1675 is a two-position dog clutch. The second carrier 1655 has a clutch engagement member 1680, and the second output shaft 1645 has a range member 1685. When actuated by the clutch actuator 1670, the clutch 1665 is able to operatively connect the range member 1685 to the clutch engagement member 1680 such that torque from the second output shaft 1645 is transferred the second carrier 1655. The torque from the second carrier 1655 is in turn transferred to the drive shaft 125 via the first planetary gear 1630. Different gear ranges from the second electric motor 1615 can be achieved by engaging and disengaging the SOWC 1660 and dog clutch 1675 in various combinations. In further variations, the clutch 1665 includes a wet disc type clutch or a dry disc type clutch.

The first electric motor 1610 is permanently connected to the drive shaft 125 (i.e., there is no clutch) such that the first electric motor 1610 is able to provide continuous power to the drive shaft 125 and propulsion system 130. In other words, the first electric motor 1610 has an uninterrupted connection to the drive shaft 125, and the second electric motor 1615 is connected to the drive shaft 125 via the SOWC 1660 or clutch 1665. This configuration of the electric powertrain 1600 facilitates power shifting in which power is always able to be provided to the wheels 135 even when shifting of the SOWC 1660 occurs. With power being continuously provided, any shifting can be made generally imperceptible to the driver and/or passengers.

By using more than one electric motor, the powertrain system 105 is configured to allow smaller, consumer automotive electric motors to be used to power larger, commercial-grade vehicles such as those with a FHWA class rating of four (4) or higher and/or those that are able to move 40,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

Again, this multiple motor design also can use energy more efficiently. The power, speed, and/or torque provide by the first electric motor 1610 and the second electric motor 1615 can be adjusted so that the motors operate in a more efficient manner for differing operational conditions. For example, the SOWC 1660 can change the gear ratios of the second gear train 1625 so as to adjust the output speed and/or torque provided by the second electric motor 1615. The SOWC 1660 can further be used to disconnect the second electric motor 1615 from the first electric motor 1610 such that the first electric motor 1610 provides all of the propulsive mechanical power to the drive shaft 125. At the same time, the second electric motor 1615 can be shut down to conserve power and allow the first electric motor 1610 operate within an efficient power band, or the speed of the second electric motor 1615 can be changed for shifting purposes. Once more, with the first electric motor 1610 permanently connected to the drive shaft 125 power can be always applied to the propulsion system 130 such that any shifting of the second gear train 1625 via the SOWC 1660 can be imperceptible to the driver and/or passengers of the vehicle 100. Given the first electric motor 1610 continuously provides power to the wheels 135, the powertrain system 105 can take the proper time during shifting so as to enhance efficiency and performance of the vehicle 100. The powertrain system 105 is able to provide more than adequate time to deal with timing and synchronization issues between the first electric motor 1610, second electric motor 1615, second gear train 1625, and/or SOWC 1660.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Belleville Spring" or "Belleville Washer" generally refers to a washer type spring with a general frustoconical shape. The Belleville spring can have varying profiles. For example, the Belleville spring can include contact flat sections that are disc shape. Other examples do not have contact flat sections. Other examples have a trapezoidal cross-sectional shape. Typically, but not always, the Belleville springs are made of elastic material like metal and/or plastic.

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, and rim clutches, to name just a few.

"Cogwheel", "Cog", or "Pinion" generally refers to a relatively small gear in a gear drive train. The cogwheel usually include a series of teeth that engage corresponding teeth on a rack or other teethed structure. Typically, but not always, the smaller cogwheel engages or is engaged inside a larger gear or to a rack. When engaging a rack, rotational motion applied to the cogwheel causes the rack to move relative to the cogwheel, thereby translating the rotational motion of the cogwheel into linear motion. By way of non-limiting examples, the cogwheel can be incorporated into differential, rack-and-pinion, and clutch bell drive trains, to name just a few. The cogwheel can be oriented in a number of manners relative to the larger gear or rack. For instance, the cogwheel can be angled perpendicular to a crown gear in a differential type drive.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Couple" or "Coupled" generally refers to an indirect and/or direct connection between the identified elements, components, and/or objects. Often the manner of the coupling will be related specifically to the manner in which the two coupled elements interact.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Eccentric" generally refers to having an axis located elsewhere than at the geometric center of an object or relative an axis of another object. As one non-limiting example, when oriented in an eccentric manner, the object has an axis of revolution displaced from the center of the object (or relative to another object) so that the object is capable of imparting reciprocating motion. In other words, something is considered eccentric when it is not placed centrally or does not have its axis or other part placed centrally.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Electronic Control Unit (ECU)" or "Electronic Control Module (ECM)" generally refers to an embedded system in electronics of a vehicle that controls one or more electrical systems and/or subsystems of the vehicle. Usually, but not always, ECUs communicate over a Controller Area Network (CAN) and can act as nodes over the CAN. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and a transceiver. These ECUs can for instance include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. By way of nonlimiting examples, types of ECUs can include ECMs, TCMs, Powertrain Control Module (PCMs), Brake Control Modules (BCMs or EBCMs), Central Control Modules (CCMs), Central Timing Modules (CTMs), General Electronic Modules (GEMs), Body Control Modules (BCMs), and/or Suspension Control Modules (SCMs), to name just a few.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Flat" generally refers to a smooth and even surface without marked lumps and/or indentations.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"Helical Spring" or "Coil Spring" generally refers to a type of spring that is formed in the shape of a helix and that returns to an initial length of the spring when unloaded. Typically, but not always, the helical springs are made of elastic material like metal and/or plastic. For example, helical springs can include tension, compression, and torsion springs, to name just a few.

"High Speed Motor" generally refers to a motor that has a maximum output speed of at least 5,000 rpm (rotations per minute) without the use of gear trains or other similar equipment for boosting speed.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Lateral" generally refers to being situated on, directed toward, or coming from the side.

"Leaf Spring" generally refers to a type of spring made from one or more strips of elastic material. In one form, multiple strips of elastic material are laminated together to form the leaf spring, and in other forms, a single strip of elastic material, such metal and/or plastic, forms the leaf spring. The leaf springs can be curved or substantially straight. The leaf spring can further include a frame to which the ends of the strips are attached.

"Longitudinal" generally relates to length or lengthwise dimension of an object, rather than across.

"Low Speed Motor" generally refers to a motor that has a maximum output speed of less than 5,000 rpm (rotations per minute) without the use of gear trains or other similar equipment for boosting speed.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Positive Clutch" generally refers to a type of clutch that is designed to transmit torque without slippage such as through a mechanical interference type connection. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Resolver" generally refers to a type of rotary sensor for measuring the degree of rotation, velocity, and/or acceleration of a rotary type device. In one example, the resolver includes rotary electrical transformer used for measuring degrees of rotation such as in an electric motor, an electric generator, and/or transmission. The resolver can include analog or digital type electrical devices. The resolver can be in the form of a two-pole type resolver or a multi-pole type resolver. Some other types of resolvers include receiver type resolvers and differential type resolvers.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Selectable One-Way Clutch" (SOWC) generally refers to a type of clutch that is able to be controlled to lock in at least one rotational direction. One-way clutches are usually (but not always) designed to transfer torque or lock when rotated in one direction and to allow rotational movement or freewheel when rotated in the opposite direction. The SOWC is a type of one-way clutch that can be used to control when and/or in which direction the rotational motion is locked or able to rotate freely. By way of a non-limiting example, the SOWC can be activated to lock so as to transfer torque when torque is applied in one rotational direction and facilitate free-wheel or slipping movement in the opposite rotational direction. In other variations, the SOWC can be controlled at times to facilitate free-wheel motion in both rotational directions or locked to allow torque transfer in both rotational directions. Alternatively or additionally, the SOWC can be controlled to switch or change the locked and freewheel rotational directions. For example, the SOWC under one operating condition can be locked when rotated in a counterclockwise and free-wheel spin in the clockwise direction, and under other conditions, the SOWC can be switched so that the SOWC is locked in the clockwise direction and freewheel spin in the counterclockwise direction. Some non-limiting examples of SOWC designs include roller, sprag, spiral, and mechanical diode type designs. The SOWC can be controlled or actuated in a number of ways such as through mechanical and/or electrical actuation. For instance, the SOWC can be actuated with hydraulic, pneumatic, and/or electrical type actuators to name just a few.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Spring" generally refers to an elastic object that stores mechanical energy. The spring can include a resilient device that can be pressed, pulled, and/or twisted but returns to its former shape when released. The spring can be made from resilient or elastic material such as metal and/or plastic The spring can counter or resist loads in many forms and apply force at constant or variable levels. For example, the spring can include a tension spring, compression spring, torsion spring, constant spring, and/or variable spring. The spring can take many forms such as by being a flat spring, a machined spring, and/or a serpentine spring. By way of nonlimiting examples, the springs can include various coil springs, pocket springs, Bonnell coils, offset coils, continuous coils, cantilever springs, volute springs, hairsprings, leaf springs, V-springs, gas springs, torsion springs, rubber bands, spring washers, and/or wave springs, to name just a few.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refers to a property of something having two sides or halves that are the same relative to one another, such as in shape, size, and/or style. In other words, symmetric describes something as having a mirror-image quality.

"Synchronizer" or "Synchronizer Mechanism" ("Synchromesh") generally refers to a device that includes a cone clutch and a blocking ring which brings the speeds of a gear and a gear selector to the same speed using friction. In one example, before the teeth of the gear and gear selector can engage, the cone clutch engages first which in turn brings the gear selector and gear to the same speed using friction. Until synchronization occurs, the teeth of the gear and the gear selector are prevented from making contact by the blocking ring. When synchronization occurs, the friction on the blocking ring is relieved and the blocking ring twists slightly. With this twisting motion, grooves or notches are aligned that allow further passage of the gear selector which brings the teeth together.

"Transmission" generally refers to a power system that provides controlled application of mechanical power. The transmission uses gears and/or gear trains to provide speed, direction, and/or torque conversions from a rotating power source to another device.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Uninterrupted Connection" generally refers to a mechanical linkage between two mechanical components without any break in continuity such that mechanical force can be transmitted on a continuous basis if so desired. The uninterrupted connection does not require a unitary connection such that the uninterrupted connection can include multiple components such as multiple shafts and gears that engage with one another. The uninterrupted connection lacks mechanisms or other structures, such as clutches, that are designed to disconnect and reconnect the mechanical linkage between the components during normal operation. It should be recognized that the uninterrupted connection can occasionally have accidental breakages that disconnect the components, but the design of the uninterrupted connection is not designed to facilitate such breakages and resulting disconnections.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

The term "or" is inclusive, meaning "and/or".

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | vehicle |
| 105 | powertrain system |
| 110 | controller |
| 115 | ESS |
| 120 | CAN |
| 125 | drive shaft |
| 130 | propulsion system |
| 135 | wheels |
| 140 | power cables |
| 200 | electric powertrain |
| 205 | transmission |
| 210 | first electric motor |
| 215 | second electric motor |
| 217 | resolver |
| 220 | first gear train |
| 225 | second gear train |
| 230 | first planetary gear |
| 235 | second planetary gear |
| 240 | first output shaft |
| 245 | second output shaft |
| 250 | sun gear |
| 255 | planet gears |
| 260 | ring gear |
| 265 | housing |
| 270 | first carrier |
| 275 | second carrier |
| 280 | clutch |
| 285 | clutch engagement member |
| 290 | first range member |
| 295 | second range member |
| 300 | electric motor transmission |
| 305 | longitudinal axis |
| 310 | rotor |
| 315 | stator |
| 320 | positive clutch |
| 325 | dog clutch |
| 330 | clutch actuator |
| 505 | first motor engagement splines |
| 510 | second motor engagement splines |
| 515 | first sun gear teeth |
| 520 | second sun gear teeth |
| 525 | clutch collar |
| 530 | clutch actuator arm assembly |
| 535 | clutch actuator guide bracket |

| Reference Numbers | |
|---|---|
| 540 | actuator rod |
| 545 | actuator motor |
| 550 | guide flanges |
| 555 | double arrow |
| 600 | clutch-shaft assembly |
| 605 | alignment pin |
| 610 | alignment pin cavity |
| 615 | clutch engagement member splines |
| 620 | first shaft engagement splines |
| 625 | first shaft opening |
| 630 | collar engagement teeth |
| 635 | first range member teeth |
| 640 | second range member teeth |
| 645 | collar cavity |
| 705 | collar alignment flange |
| 805 | second shaft opening |
| 810 | teeth support rib |
| 815 | clutch facing surface |
| 820 | planet pin openings |
| 825 | flanges |
| 830 | spacers |
| 905 | clutch facing surface |
| 910 | spacer flange |
| 915 | carrier race |
| 920 | motor engaging section |
| 1005 | collar teeth |
| 1010 | shifting teeth |
| 1015 | beveled surfaces |
| 1020 | first range portion |
| 1025 | second range portion |
| 1030 | range separator tab |
| 1035 | second range disengagement race |
| 1040 | shift fork groove |
| 1045 | fork groove flanges |
| 1105 | shift fork |
| 1110 | fork actuator arm |
| 1115 | clutch suspension |
| 1120 | pivot pin |
| 1125 | fork arms |
| 1130 | guide pads |
| 1135 | pad body |
| 1140 | pad pin |
| 1145 | pin opening |
| 1150 | clip arms |
| 1155 | actuator rod collar |
| 1160 | rod guide openings |
| 1165 | torsion spring |
| 1170 | spring collar |
| 1175 | shift fork end |
| 1180 | actuator arm end |
| 1185 | fork cross pin |
| 1190 | actuator cross pin |
| 1205 | double arrow |
| 1305 | dog clutch |
| 1310 | leaf spring |
| 1405 | dog clutch |
| 1410 | coil spring |
| 1505 | dog clutch |
| 1510 | Belleville spring |
| 1600 | electric powertrain |
| 1605 | transmission |
| 1610 | first electric motor |
| 1612 | first inverter |
| 1615 | second electric motor |
| 1617 | second inverter |
| 1620 | first gear train |
| 1625 | second gear train |
| 1630 | first planetary gear |
| 1635 | second planetary gear |
| 1640 | first output shaft |
| 1645 | second output shaft |
| 1650 | first carrier |
| 1652 | first ring gear |
| 1655 | second carrier |
| 1657 | second ring gear |
| 1660 | SOWC |
| 1662 | clutch actuator |
| 1665 | clutch |
| 1670 | clutch actuator |
| 1675 | dog clutch |
| 1680 | clutch engagement member |
| 1685 | range member |

What is claimed is:

1. A powertrain system, comprising:
a first electric motor having an uninterrupted connection to an output;
a second electric motor having a clutch connected to the output;
wherein the clutch includes a positive clutch;
wherein the clutch includes a clutch collar and a clutch actuator arm coupled to the clutch collar;
wherein the clutch actuator arm includes a shift fork, a fork actuator arm, a pivot pin, and a clutch suspension;
wherein the shift fork is coupled to the clutch collar;
wherein the pivot pin pivotally connects the shift fork, the fork actuator arm, and the clutch suspension;
a clutch actuator configured to pivot the clutch actuator arm about the pivot pin;
wherein the clutch suspension includes a spring biased between the fork actuator arm and the shift fork;
wherein the spring includes a torsion spring wrapped around the pivot pin; and
a controller configured to engage the clutch based on resolver information from the first electric motor and the second electric motor.

2. The powertrain system of claim 1, wherein the positive clutch includes a dog clutch.

3. The powertrain system of claim 1, further comprising:
a planetary gear is configured to change torque from the second electric motor based on clutch position of the clutch.

4. The powertrain system of claim 1 wherein the clutch includes:
wherein the clutch collar defines a shift fork groove;
one or more guide pads slidably disposed in the shift fork groove of the clutch collar;
the shift fork including one or more fork arms; and
wherein the fork arms are pivotally coupled to the guide pads.

5. The powertrain system of claim 4, further comprising:
a clutch actuator guide bracket; and
a clutch actuator arm is pivotally coupled to the clutch actuator guide bracket to facilitate pivotal movement of the clutch actuator arm.

6. The powertrain system of claim 1, wherein:
the first electric motor includes a first resolver;
the first resolver is internal to the first electric motor;
the first resolver is operatively coupled to the controller to communicate with the controller;
the second electric motor includes a second resolver;
the second resolver is internal to the second electric motor;
the second resolver is operatively coupled to the controller to communicate with the controller; and
the controller is configured to engage the clutch based on resolver information from the first resolver of the first electric motor and the second resolver of the second electric motor.

7. The powertrain system of claim 1, further comprising:
a controller area network (CAN) operatively coupled to the controller;
wherein the first electric motor includes a first resolver;
wherein the first resolver is operatively coupled to the controller via the CAN;
wherein the second electric motor includes a second resolver;
wherein the second resolver is operatively coupled to the controller via the CAN; and
wherein the controller is configured to engage the clutch based on resolver information from the first resolver of the first electric motor and the second resolver of the second electric motor.

8. The powertrain system of claim 7, wherein:
the positive clutch lacks a synchromesh;
the positive clutch includes a dog clutch;
the first resolver is internal to the first electric motor; and
the second resolver is internal to the second electric motor.

9. A powertrain system, comprising:
a first electric motor having an uninterrupted connection to an output;
a second electric motor having a clutch connected to the output;
wherein the clutch includes a positive clutch;
wherein the clutch includes a clutch collar and a clutch actuator arm coupled to the clutch collar;
wherein the clutch actuator arm includes a shift fork, a fork actuator arm, a pivot pin, and a clutch suspension;
wherein the shift fork is coupled to the clutch collar;
wherein the pivot pin pivotally connects the shift fork, the fork actuator arm, and the clutch suspension;
a clutch actuator configured to pivot the clutch actuator arm about the pivot pin;
wherein the clutch suspension includes a spring biased between the fork actuator arm and the shift fork;
wherein the clutch actuator includes a clutch actuator rod and an actuator rod collar coupled to the clutch actuator rod;
wherein the clutch suspension includes a leaf spring connected between the actuator rod collar and the shift fork; and
a controller configured to engage the clutch based on resolver information from the first electric motor and the second electric motor.

10. The powertrain system of claim 9, wherein the positive clutch includes a dog clutch.

11. The powertrain system of claim 9, further comprising:
a planetary gear configured to change torque from the second electric motor based on clutch position of the clutch.

12. The powertrain system of claim 9, wherein the clutch includes:
the clutch collar defining a shift fork groove;
one or more guide pads slidably disposed in the shift fork groove of the clutch collar;
the shift fork including one or more fork arms; and
wherein the fork arms are pivotally coupled to the guide pads.

13. The powertrain system of claim 12, further comprising:
a clutch actuator guide bracket; and
wherein the clutch actuator arm is pivotally coupled to the clutch actuator guide bracket to facilitate pivotal movement of the clutch actuator arm.

14. The powertrain system of claim 9, wherein:
the first electric motor includes a first resolver;
the first resolver is internal to the first electric motor;
the first resolver is operatively coupled to the controller to communicate with the controller;
the second electric motor includes a second resolver;
the second resolver is internal to the second electric motor;
the second resolver is operatively coupled to the controller to communicate with the controller; and
the controller is configured to engage the clutch based on resolver information from the first resolver of the first electric motor and the second resolver of the second electric motor.

15. The powertrain system of claim 9, further comprising:
a controller area network (CAN) operatively coupled to the controller;
wherein the first electric motor includes a first resolver;
wherein the first resolver is operatively coupled to the controller via the CAN;
wherein the second electric motor includes a second resolver;
wherein the second resolver is operatively coupled to the controller via the CAN; and
wherein the controller is configured to engage the clutch based on resolver information from the first resolver of the first electric motor and the second resolver of the second electric motor.

16. The powertrain system of claim 15, wherein:
the positive clutch lacks a synchromesh;
the positive clutch includes a dog clutch;
the first resolver is internal to the first electric motor; and
the second resolver is internal to the second electric motor.

* * * * *